(12) United States Patent
Ito

(10) Patent No.: US 7,460,310 B2
(45) Date of Patent: Dec. 2, 2008

(54) ZOOM LENS AND IMAGE PICKUP APPARATUS INCLUDING THE LENS

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/022,807

(22) Filed: Jan. 30, 2008

(65) Prior Publication Data
US 2008/0180810 A1 Jul. 31, 2008

(30) Foreign Application Priority Data
Jan. 30, 2007 (JP) ............... 2007-019134

(51) Int. Cl.
G02B 15/14 (2006.01)
(52) U.S. Cl. ...................... 359/680; 359/689
(58) Field of Classification Search ................ 359/680, 359/683, 685, 686, 687, 689
See application file for complete search history.

(56) References Cited
U.S. PATENT DOCUMENTS
| | | | |
|---|---|---|---|
| 4,838,666 A | 6/1989 | Shiraishi | |
| 6,498,687 B1 | 12/2002 | Sekita et al. | |
| 6,545,819 B1 | 4/2003 | Nanba et al. | |
| 7,019,911 B2 | 3/2006 | Saruwatari | |
| 7,215,483 B2 | 5/2007 | Sekita | |
| 7,369,323 B2 * | 5/2008 | Yoshitsugu | 359/682 |

FOREIGN PATENT DOCUMENTS
JP 07-261083 A 10/1995
JP 2006-065034 A 3/2006

* cited by examiner

Primary Examiner—Timothy J Thompson
(74) Attorney, Agent, or Firm—Canon USA Inc IP Div

(57) ABSTRACT

A zoom lens includes a first lens unit having a negative refractive power, a second lens unit having a positive refractive power, and a third lens unit having a positive refractive power. The first to third lens units are arranged in that order from an object side toward an image side, and change the distances therebetween during zooming. The following conditions are satisfied:

$$0.70 < f2/\sqrt{fW \cdot fT} < 0.95, \text{ and}$$

$$2.9 < (\beta 2T \cdot \beta 3W)/(\beta 2W \cdot \beta 3T) < 3.7$$

where fW and fT respectively represent the focal lengths of the entire zoom lens at a wide angle end and a telephoto end, f2 represents the focal length of the second lens unit, $\beta 2W$ and $\beta 2T$ respectively represent the imaging magnifications of the second lens unit at the wide angle end and the telephoto end, and $\beta 3W$ and $\beta 3T$ respectively represent the imaging magnifications of the third lens unit at the wide angle end and the telephoto end.

13 Claims, 21 Drawing Sheets

ZOOM LENS AND IMAGE PICKUP APPARATUS INCLUDING THE LENS

BACKGROUND OF THE INVENTION

1. Field of the Invention

The present invention relates to a zoom lens suitably used in an image pickup apparatus such as a digital still camera or a video camera.

2. Description of the Related Art

A zoom lens for use in an image pickup apparatus (camera), such as a video camera or a digital still camera, including a solid-state image pickup element is required to have a compact lens system and a high optical performance.

In a camera including a solid-state image pickup element, a zoom lens needs to have a relatively long back focus because optical components, such as a low-pass filter and a color correction filter, are disposed between the rear of the lens and the solid-state image pickup element.

In order to avoid color shading, a color camera including a solid-state image pickup element for a color image is required to include a zoom lens having a good telecentric characteristic on the image-side.

Further, in order to reduce the thickness of an image pickup apparatus by using a so-called retractable zoom lens, it is known that protrusion of lens units from a camera body is reduced by decreasing the distances between the lens units in the zoom lens while an imaging operation is not performed. In this case, for efficient thickness reduction, it is necessary to reduce the number of lenses that constitute the lens units so as to reduce the thicknesses of the lens units.

If the moving amounts of the lens units during zooming and focusing are large, the total length of the zoom lens increases, and it is difficult to reduce the retracted length and to use the lens units in the retractable zoom lens. This tendency becomes more pronounced as the zoom ratio of the zoom lens increases.

A negative lead zoom lens in which a lens unit having a negative refractive power leads is known as a zoom lens having a relatively long back focus.

U.S. Pat. Nos. 6,545,819 and 6,498,687 disclose a compact three-unit zoom lens in which a first lens unit having a negative refractive power, a second lens unit having a positive refractive power, and a third lens unit having a positive refractive power are arranged in that order from the object side to the image side. The zoom lens is telecentric on the image side.

U.S. Pat. Nos. 7,019,911 and 7,215,483 and Japanese Patent Laid-Open No. 2006-65034 disclose a three-unit zoom lens that is provided with a high zoom ratio of three or more by moving all lens units during zooming.

U.S. Pat. No. 4,838,666 and Japanese Patent Laid-Open No. 7-261083 disclose a wide-angle three-unit zoom lens that has a long back focus and that is telecentric on the image side.

In the above-described three-zoom lenses, the second lens unit serves functions as a variator. For this reason, in order to reduce the total size of the lens system and to achieve a high optical performance over the entire zoom range, it is necessary to reduce aberration changes during zooming in the second lens unit. For that purpose, it is important to appropriately set the refractive power and magnification of the second lens unit serving as the variator and the lens configuration.

In addition, it is important to appropriately set the imaging magnification of the third lens unit in order to increase the zoom ratio.

SUMMARY OF THE INVENTION

The present invention provides a compact zoom lens having a high optical performance over the entire zoom range, and an image pickup apparatus including the zoom lens.

A zoom lens according to an aspect of the present invention includes a first lens unit having a negative refractive power, a second lens unit having a positive refractive power, and a third lens unit having a positive refractive power. The first to third lens units are arranged in that order from an object side toward an image side. The distances between the first to third lens units change during zooming. The following conditional expressions are satisfied:

$$0.70 < f2/\sqrt{(fW \cdot fT)} < 0.95, \text{ and}$$

$$2.9 < (\beta 2T \cdot \beta 3W)/(\beta 2W \cdot \beta 3T) < 3.7$$

where fW and fT respectively represent the focal lengths of the entire zoom lens at a wide angle end and a telephoto end, f2 represents the focal length of the second lens unit, $\beta 2W$ and $\beta 2T$ respectively represent the imaging magnifications of the second lens unit at the wide angle end and the telephoto end, and $\beta 3W$ and $\beta 3T$ respectively represent the imaging magnifications of the third lens unit at the wide angle end and the telephoto end.

Further features of the present invention will become apparent from the following description of exemplary embodiments with reference to the attached drawings.

DESCRIPTION OF THE EMBODIMENTS

A zoom lens and an image pickup apparatus including the zoom lens will be described below with reference with exemplary embodiments.

In the zoom lenses according to the exemplary embodiments, a first lens unit having a negative refractive power, a second lens unit having a positive refractive power, and a third lens unit having a positive refractive power are arranged in that order from the object side to the image side, and the distances between the lens units are changed during zooming.

In the exemplary embodiments, the first lens unit moves along a convex locus to the image side, the second lens unit moves to the object side, and the third lens unit moves to the image side during zooming from a wide angle end (short focal-length end) to a telephoto end (long focal-length end).

Figure 1:
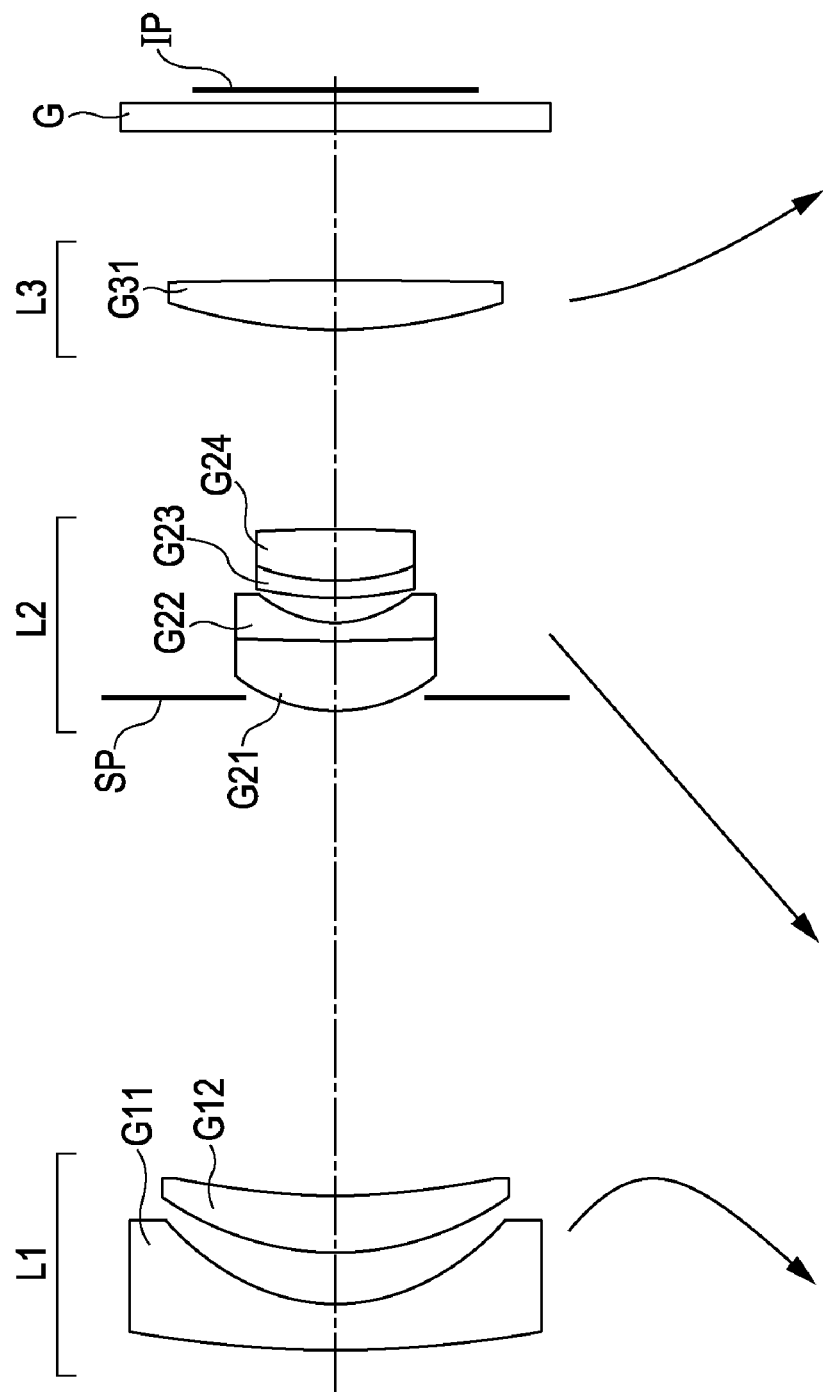
FIG. 1 is a cross-sectional view of a zoom lens according to a first exemplary embodiment of the present invention.
Figure 2:
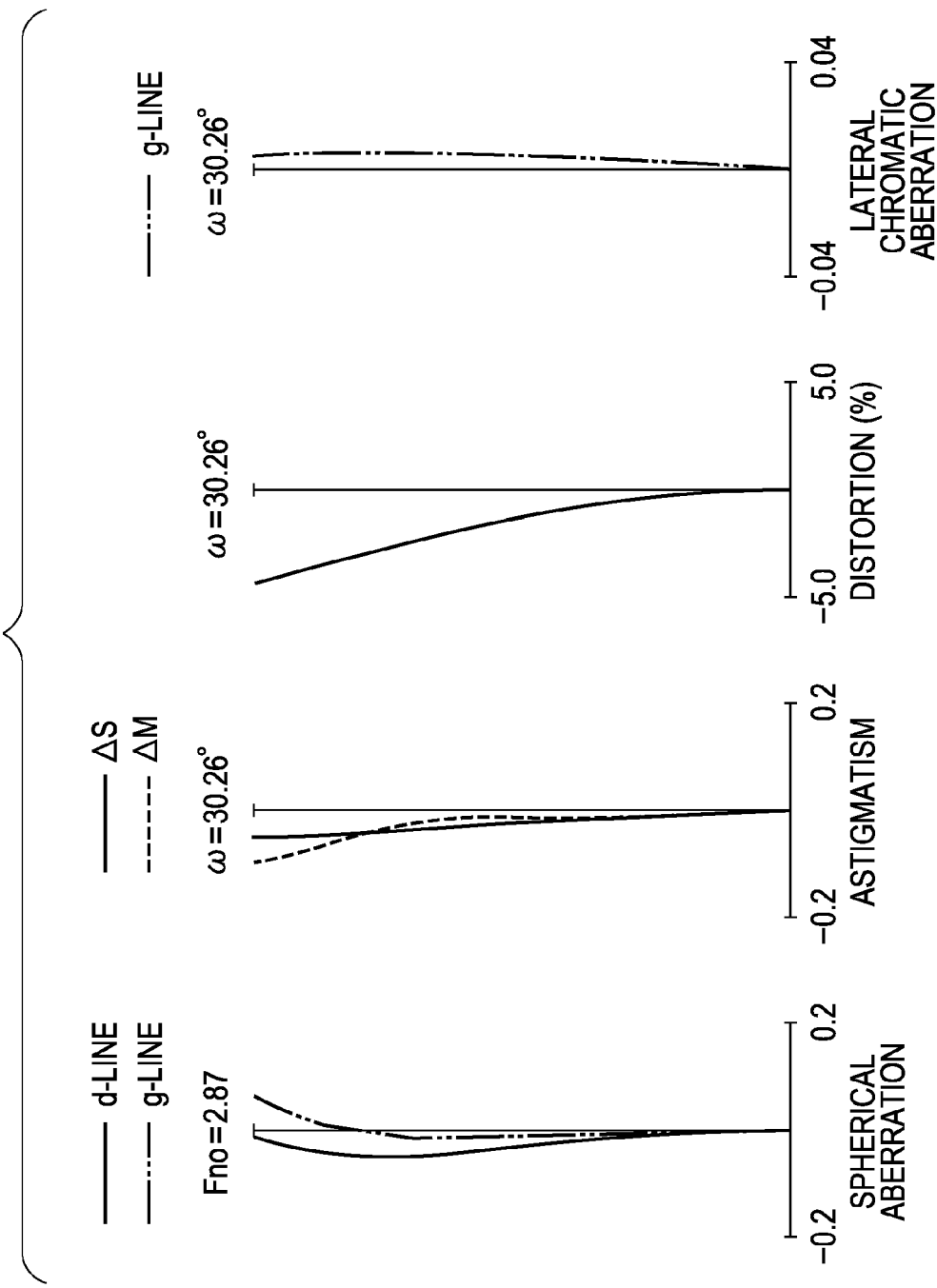
FIG. 2 includes aberration diagrams of the zoom lens at a wide angle end in the first exemplary embodiment.
Figure 3:
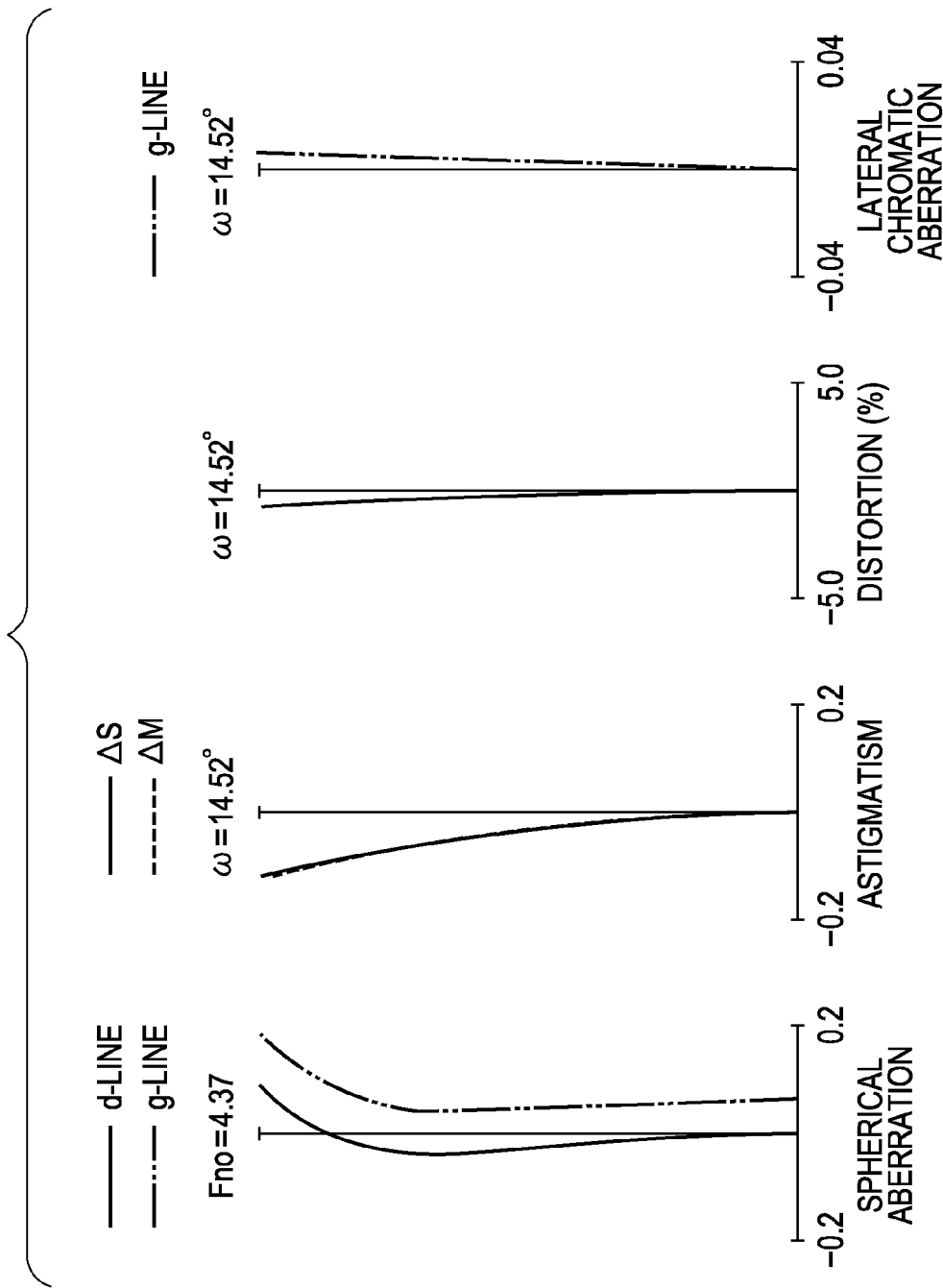
FIG. 3 includes aberration diagrams of the zoom lens at an intermediate zoom position in the first exemplary embodiment.
Figure 4:
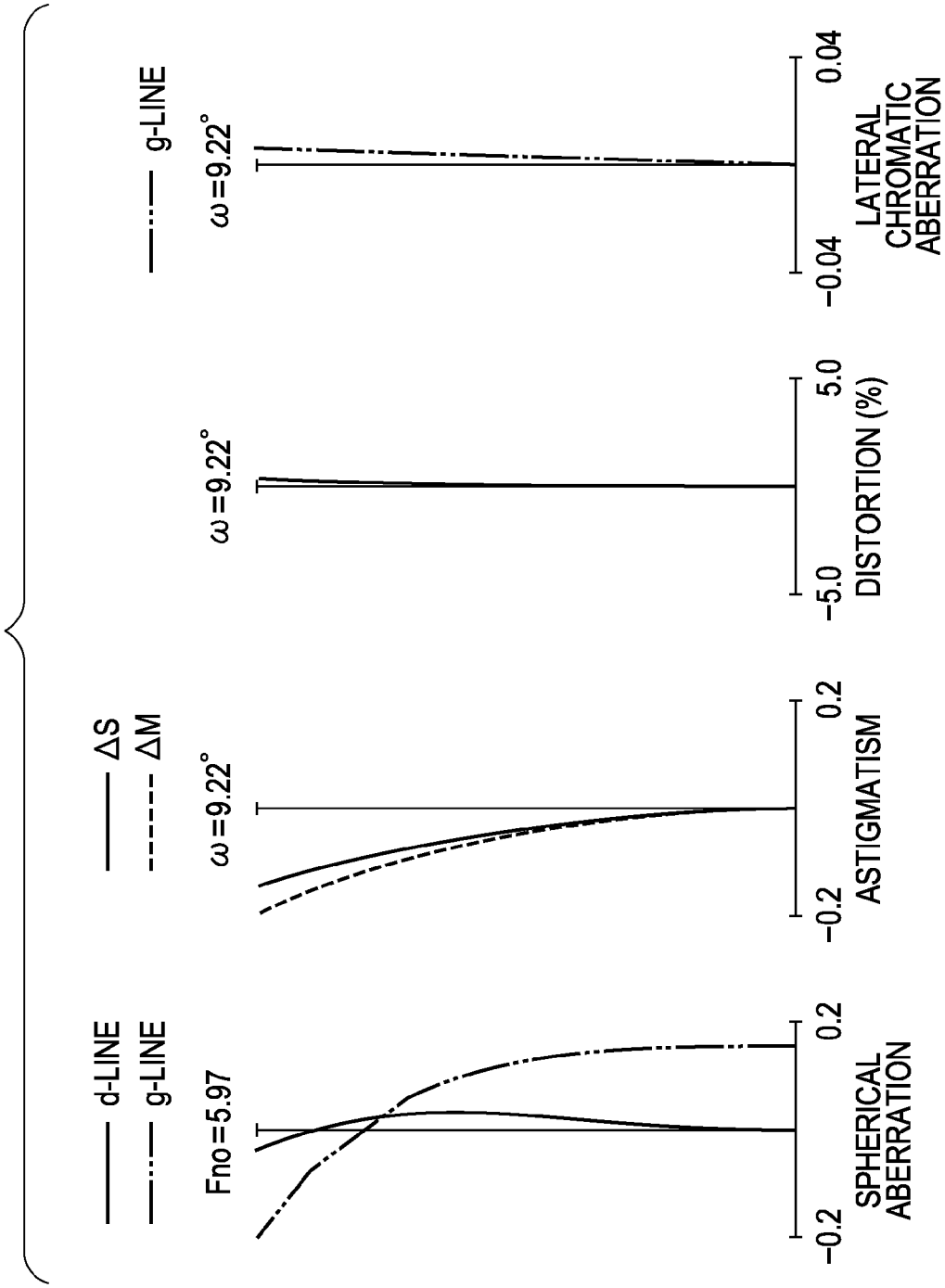
FIG. 4 includes aberration diagrams of the zoom lens at a telephoto end in the first exemplary embodiment.

FIG. 1 is a cross-sectional view of a zoom lens at the wide angle end according to a first exemplary embodiment of the present invention. FIGS. 2, 3, and 4 are aberration diagrams of the zoom lens, respectively, at the wide angle end, at an intermediate zoom position, and at the telephoto end. The zoom lens of the first exemplary embodiment has a zoom ratio of 3.6 and an aperture ratio of about 2.9 to 6.0.

Figure 5:
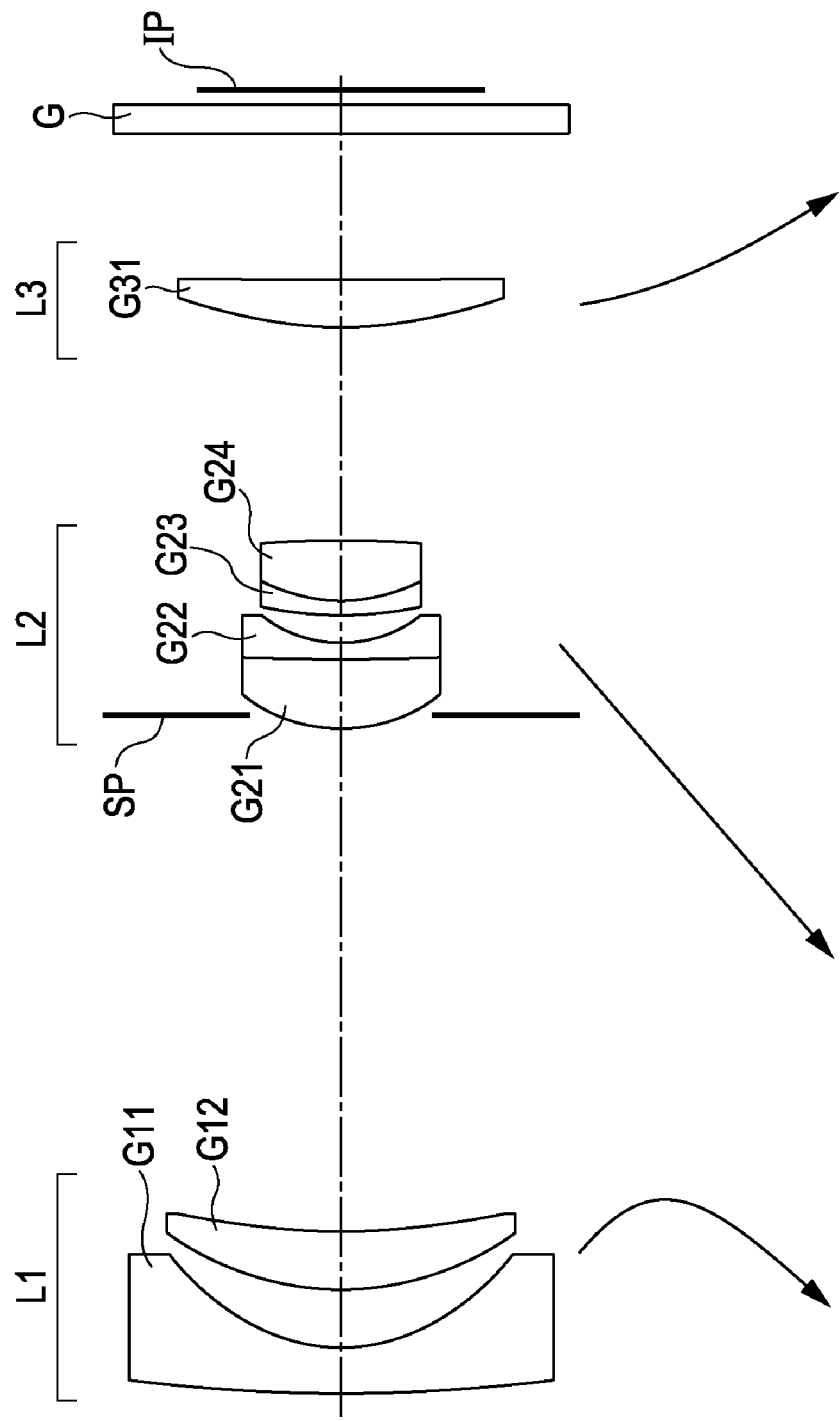
FIG. 5 is a cross-sectional view of a zoom lens according to a second exemplary embodiment of the present invention.
Figure 6:
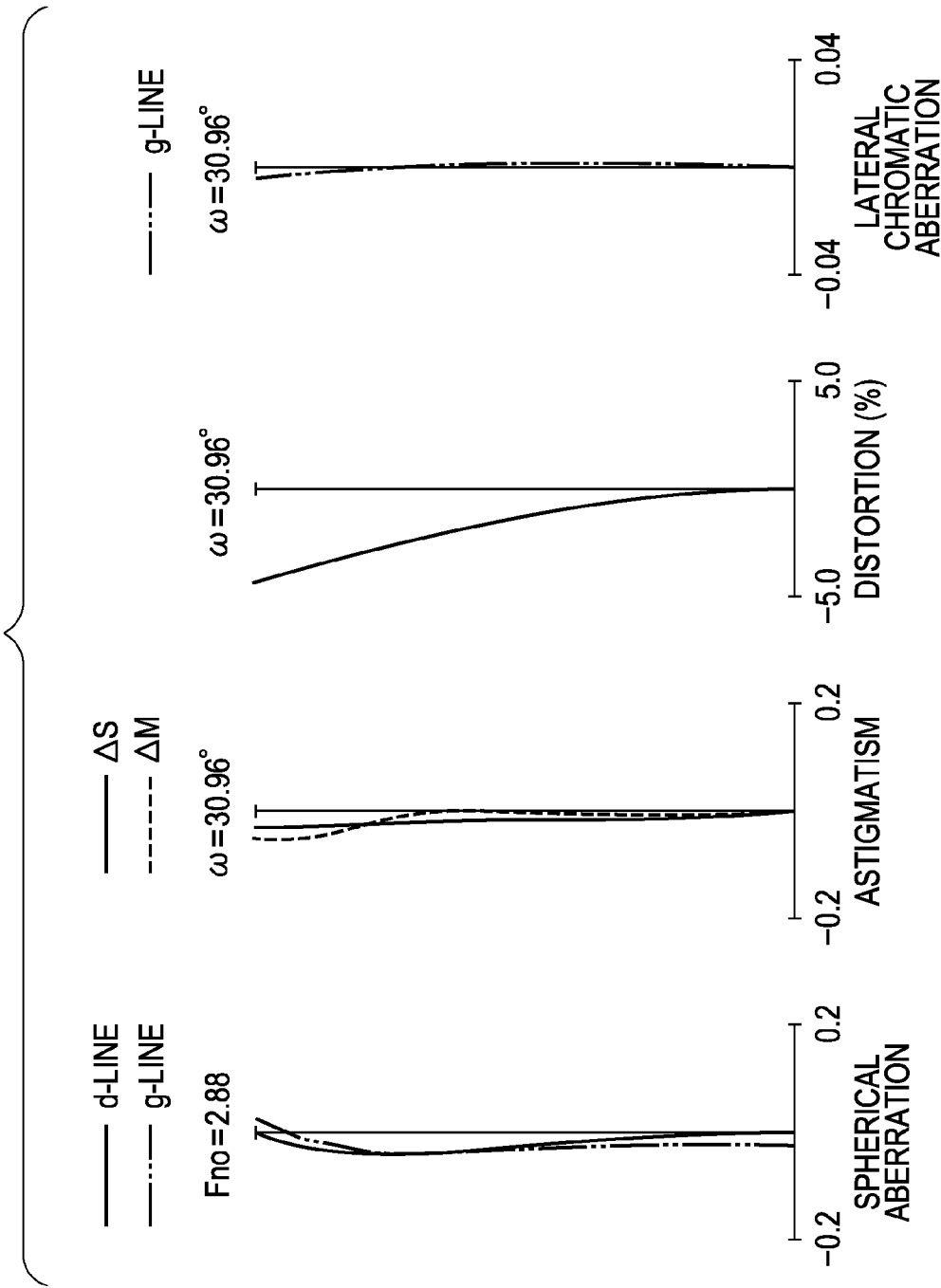
FIG. 6 includes aberration diagrams of the zoom lens at the wide angle end in the second exemplary embodiment.
Figure 7:
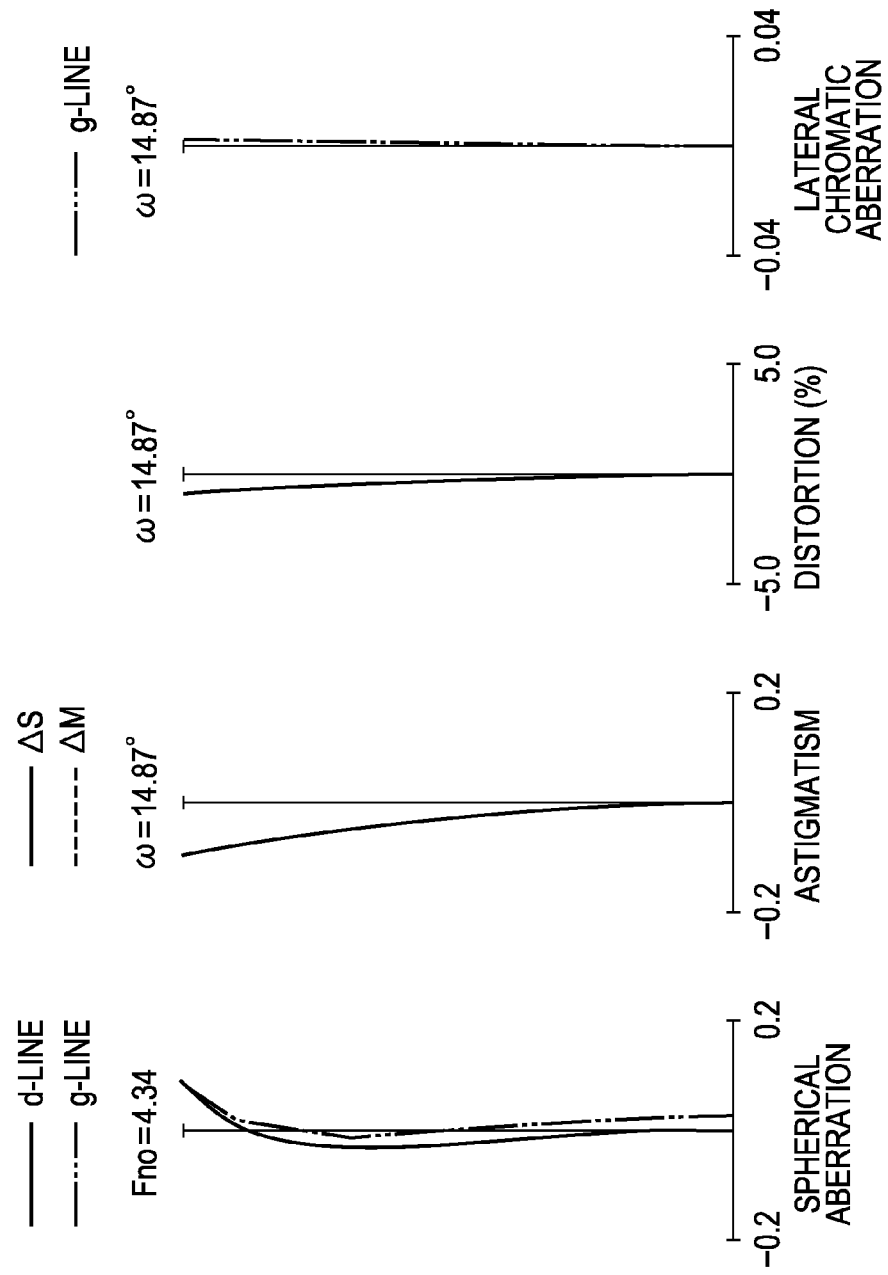
FIG. 7 includes aberration diagrams of the zoom lens at the intermediate zoom position in the second exemplary embodiment.
Figure 8:
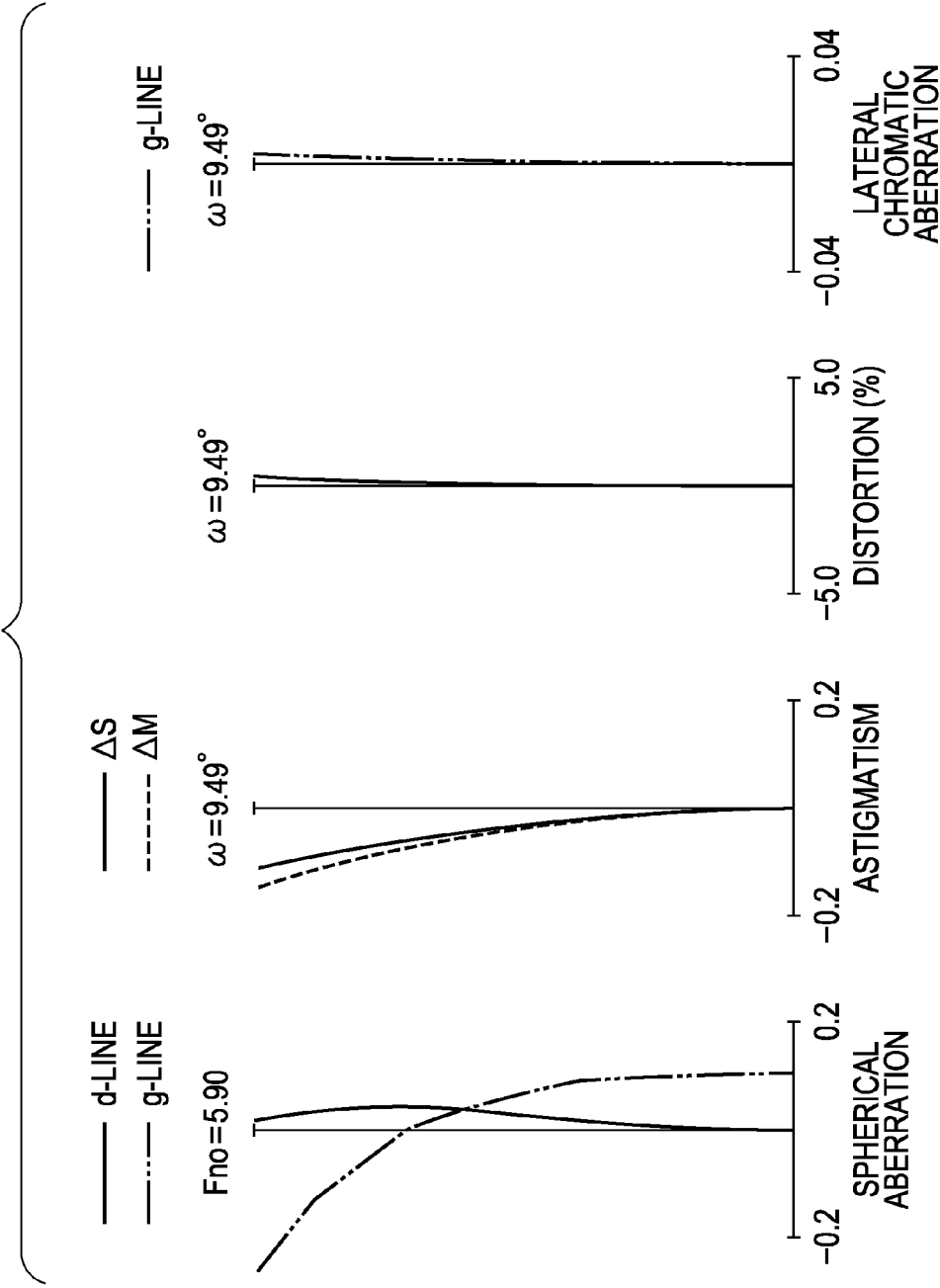
FIG. 8 includes aberration diagrams of the zoom lens at the telephoto end in the second exemplary embodiment.

FIG. 5 is a cross-sectional view of a zoom lens at the wide angle end according to a second exemplary embodiment of the present invention. FIGS. 6, 7, and 8 are aberration diagrams of the zoom lens, respectively, at the wide angle end, at the intermediate zoom position, and at the telephoto end. The zoom lens of the second exemplary embodiment has a zoom ratio of 3.6 and an aperture ratio of about 2.9 to 5.9.

Figure 9:
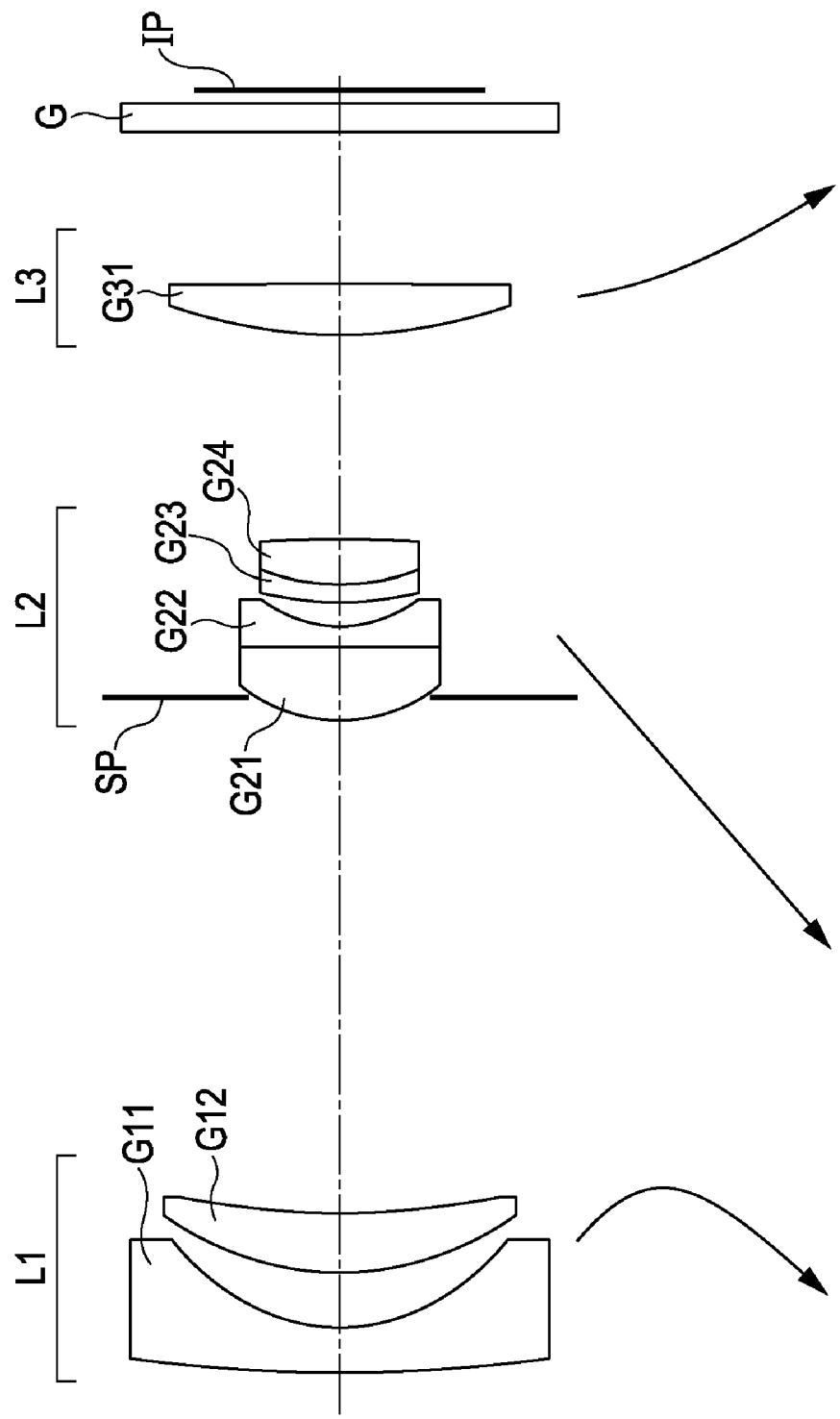
FIG. 9 is a cross-sectional view of a zoom lens according to a third exemplary embodiment of the present invention.
Figure 10:
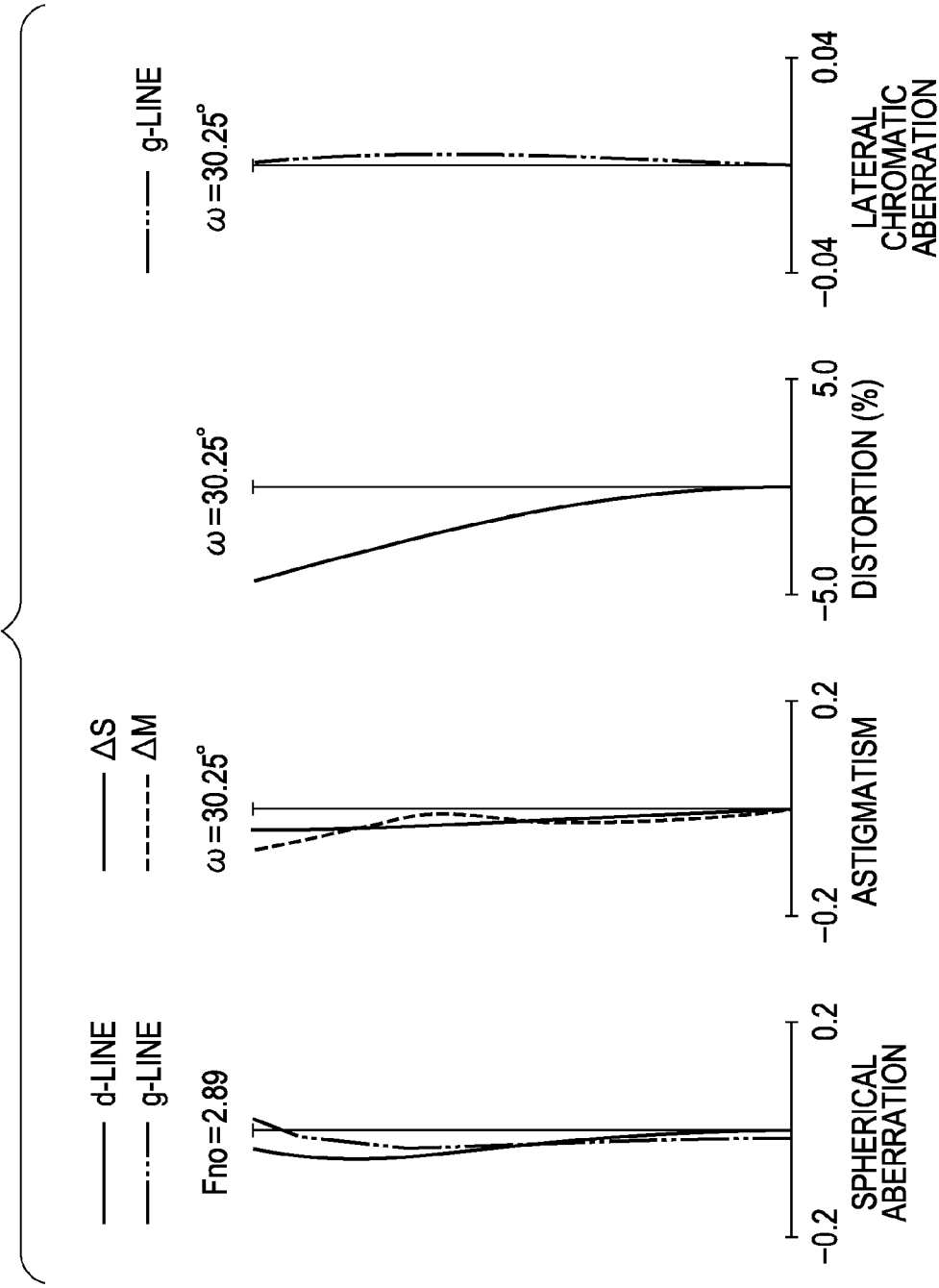
FIG. 10 includes aberration diagrams of the zoom lens at the wide angle end in the third exemplary embodiment.
Figure 11:
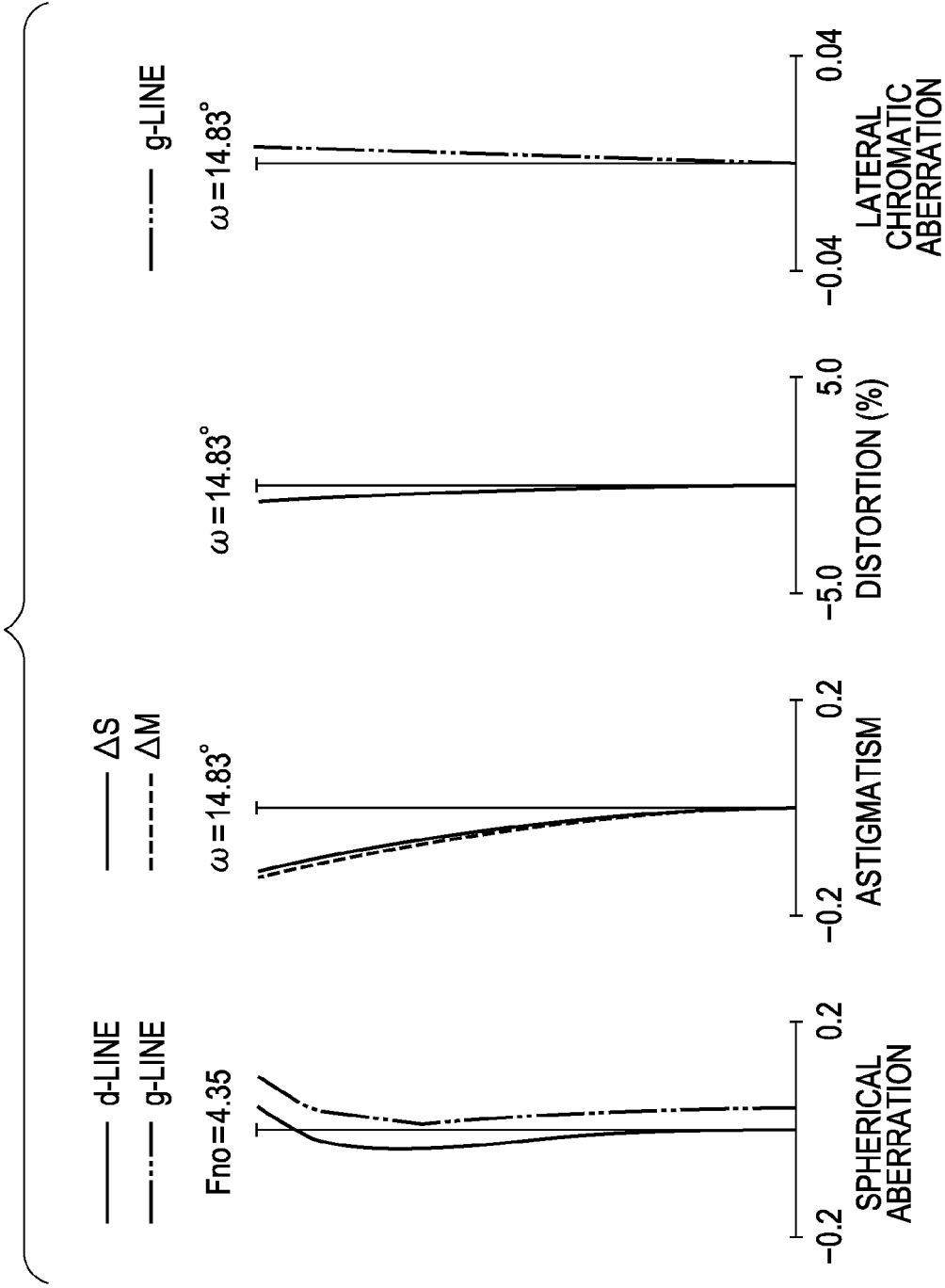
FIG. 11 includes aberration diagrams of the zoom lens at the intermediate zoom position in the third exemplary embodiment.
Figure 12:
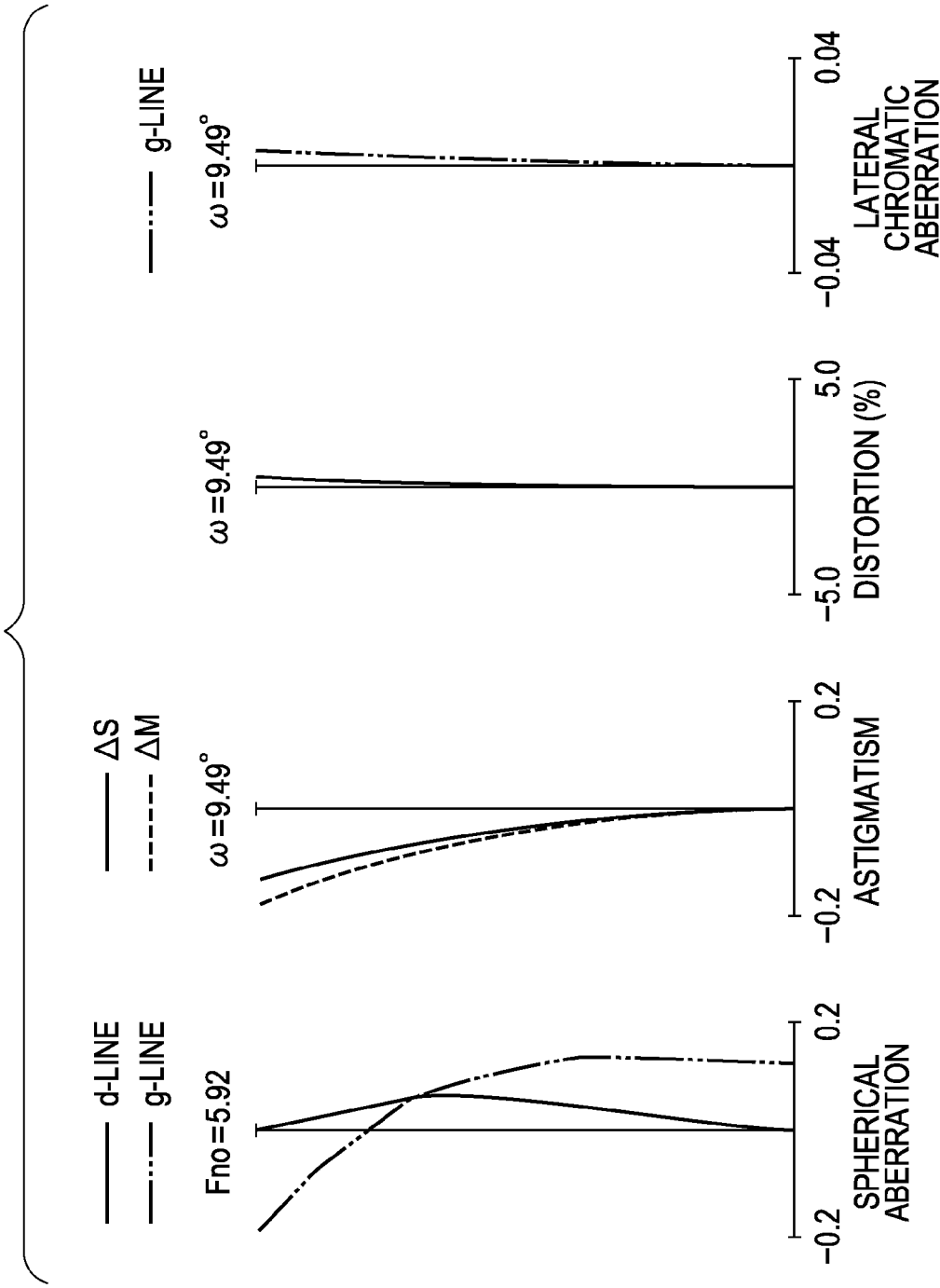
FIG. 12 includes aberration diagrams of the zoom lens at the telephoto end in the third exemplary embodiment.

FIG. 9 is a cross-sectional view of a zoom lens at the wide angle end according to a third exemplary embodiment of the present invention. FIGS. 10, 11, and 12 are aberration diagrams of the zoom lens, respectively, at the wide angle end, at the intermediate zoom position, and at the telephoto end. The zoom lens of the third exemplary embodiment has a zoom ratio of 3.5 and an aperture ratio of about 2.9 to 5.9.

Figure 13:
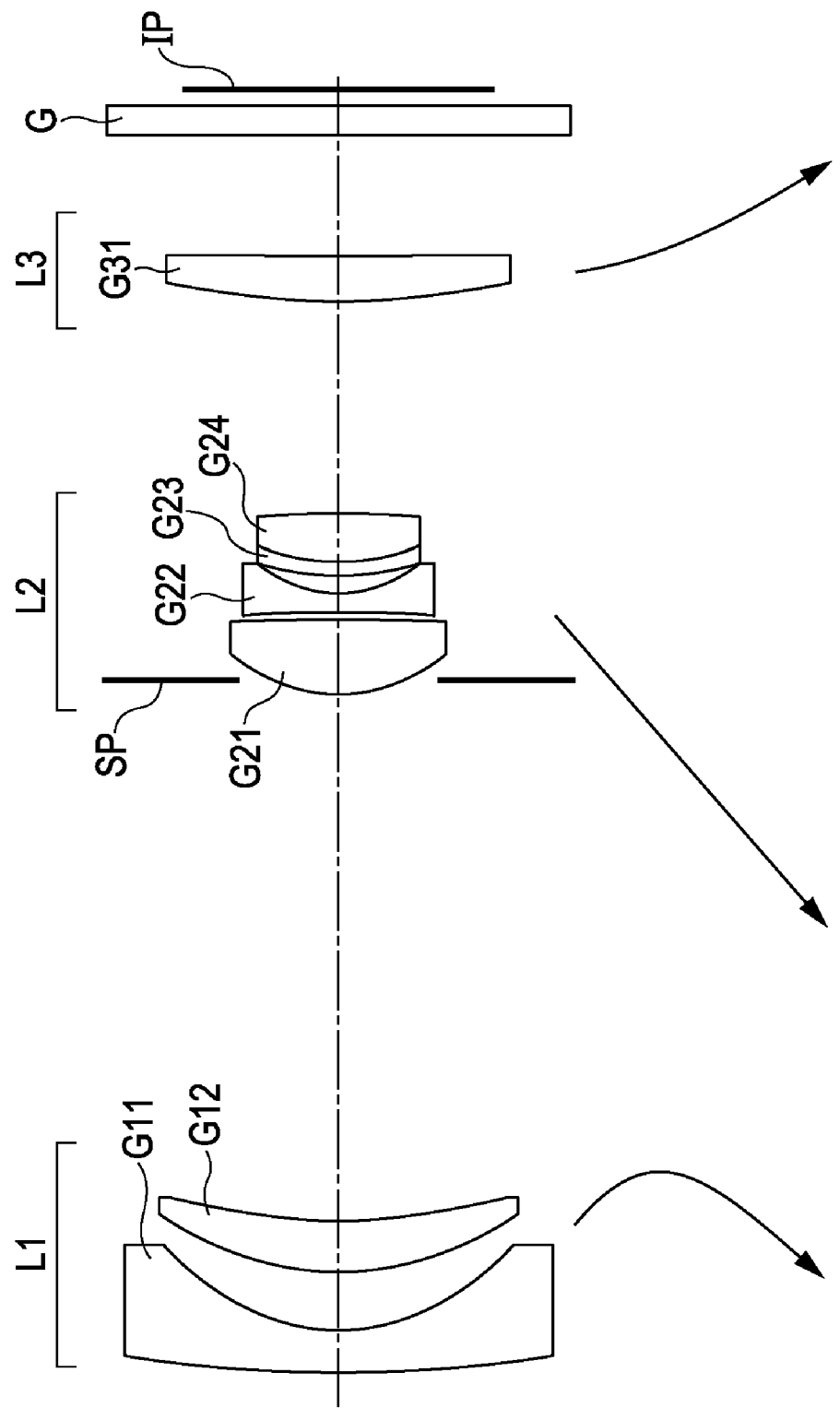
FIG. 13 is a cross-sectional view of a zoom lens according to a fourth exemplary embodiment.
Figure 14:
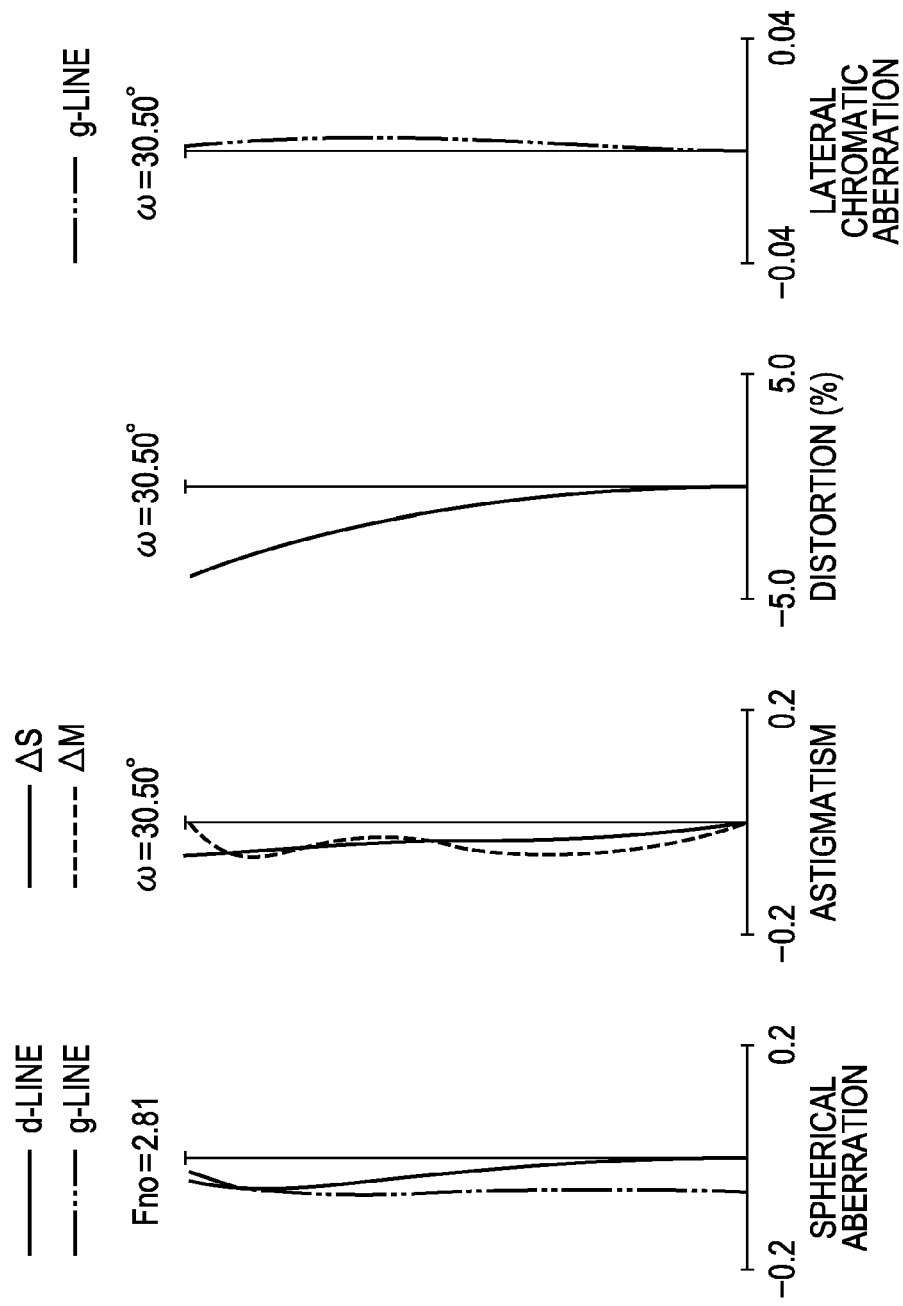
FIG. 14 includes aberration diagrams of the zoom lens at the wide angle end in the fourth exemplary embodiment.
Figure 15:
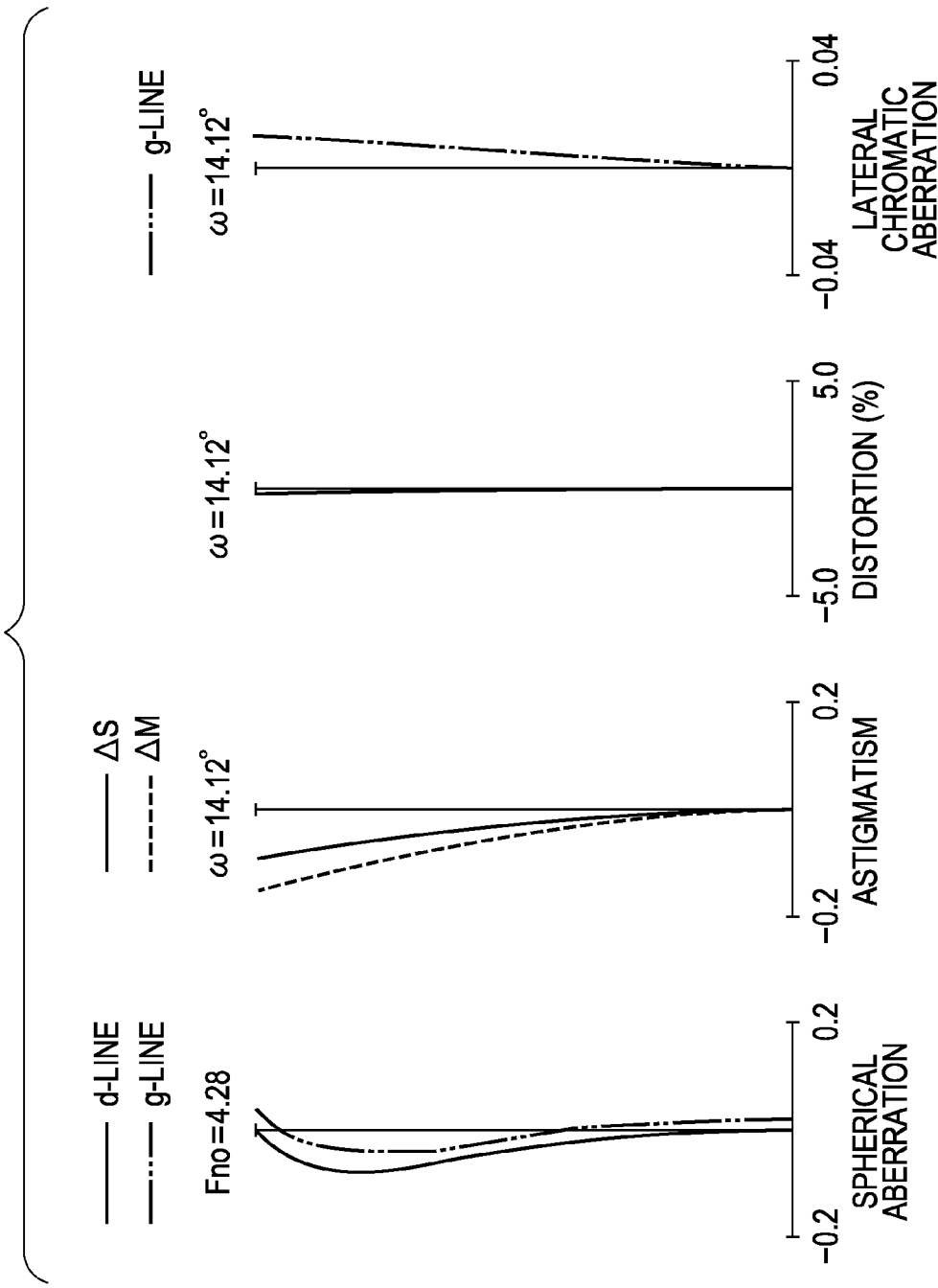
FIG. 15 includes aberration diagrams of the zoom lens at the intermediate zoom position in the fourth exemplary embodiment.
Figure 16:
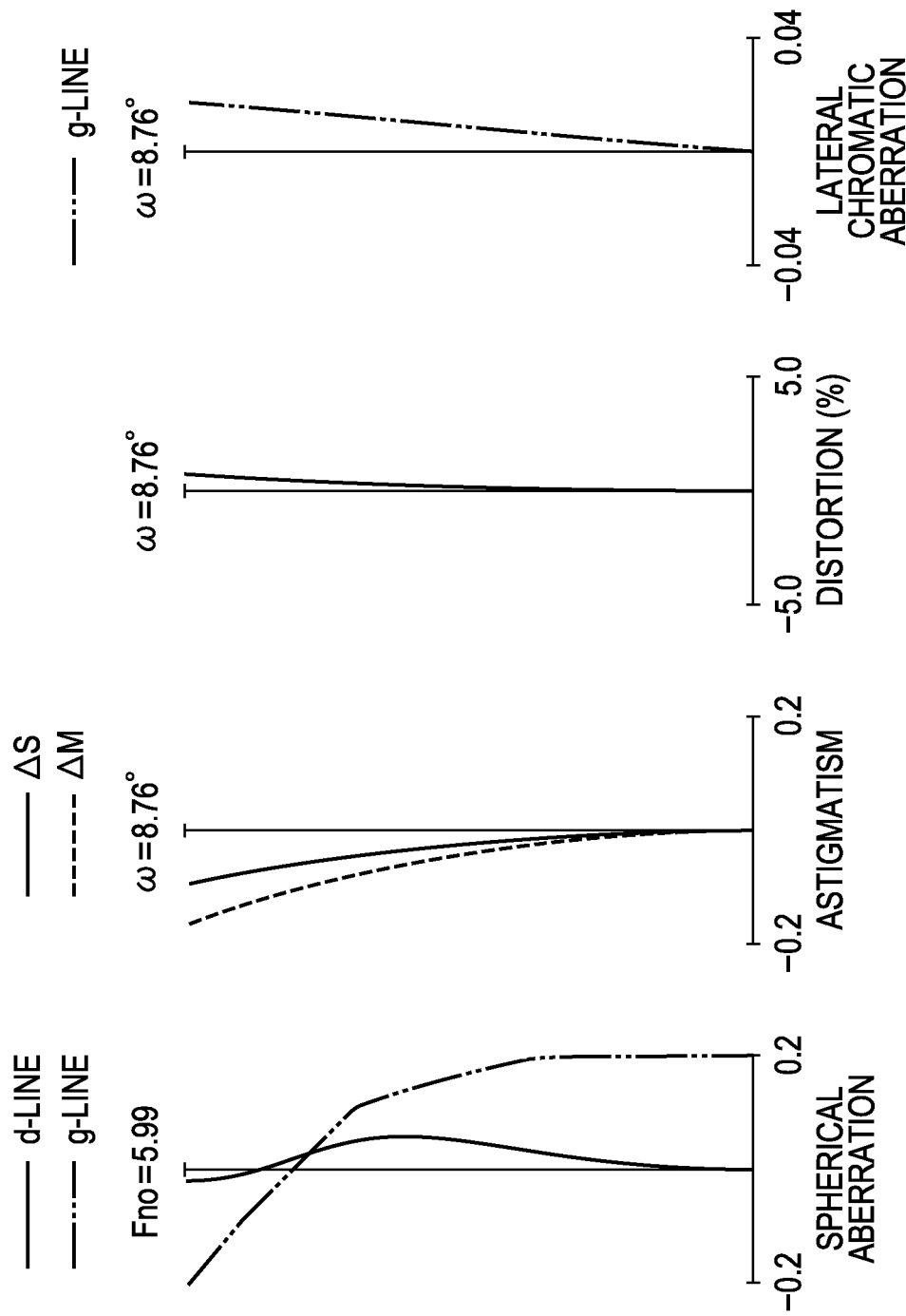
FIG. 16 includes aberration diagrams of the zoom lens at the telephoto end in the fourth exemplary embodiment.

FIG. 13 is a cross-sectional view of a zoom lens at the wide angle end according to a fourth exemplary embodiment of the present invention. FIGS. 14, 15, and 16 are aberration diagrams of the zoom lens, respectively, at the wide angle end, at the intermediate zoom position, and at the telephoto end. The zoom lens of the fourth exemplary embodiment has a zoom ratio of 3.8 and an aperture ratio of about 2.8 to 6.0.

Figure 17:
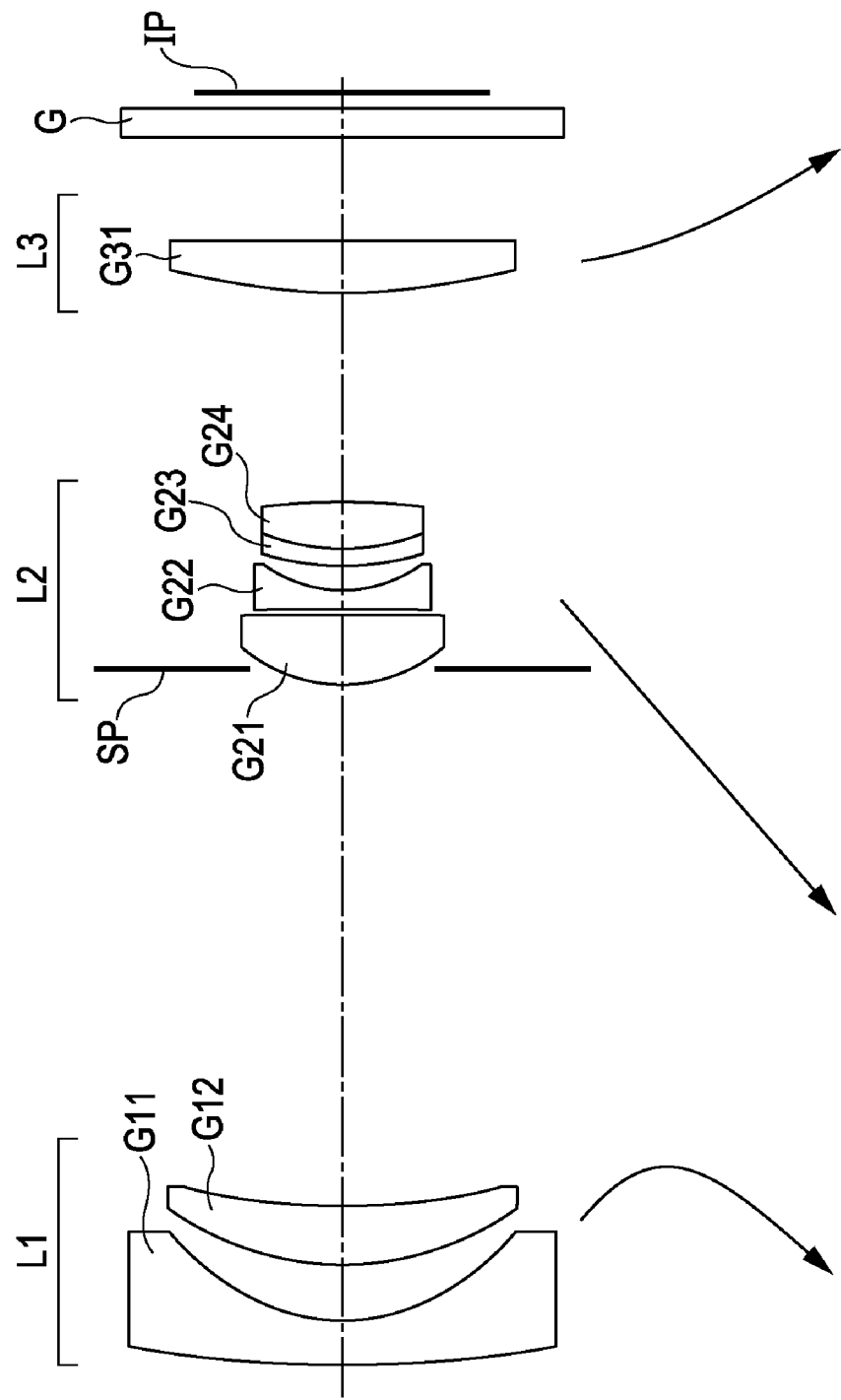
FIG. 17 is a cross-sectional view of a zoom lens according to a fifth exemplary embodiment.
Figure 18:
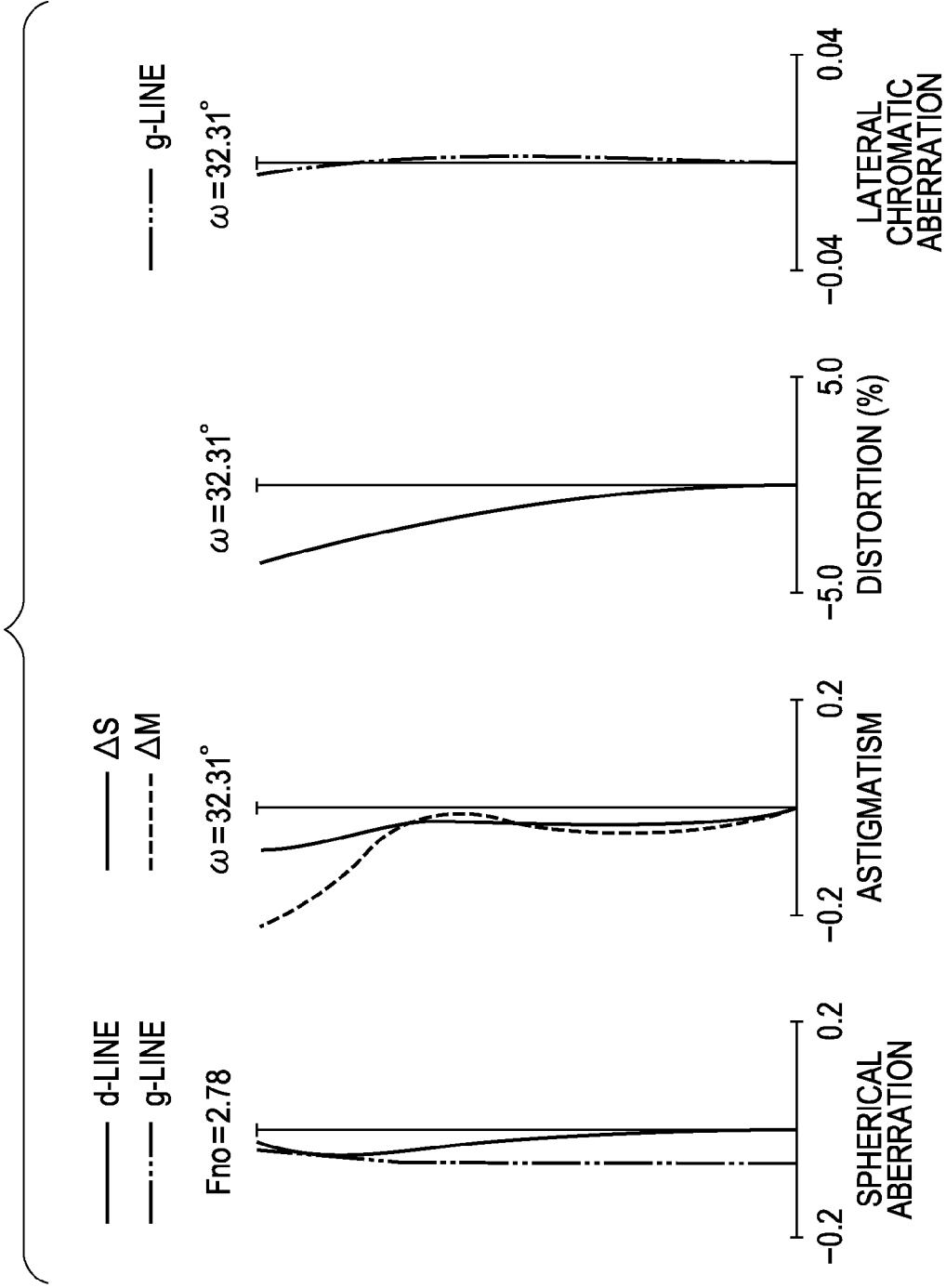
FIG. 18 includes aberration diagrams of the zoom lens at the wide angle end in the fifth exemplary embodiment.
Figure 19:
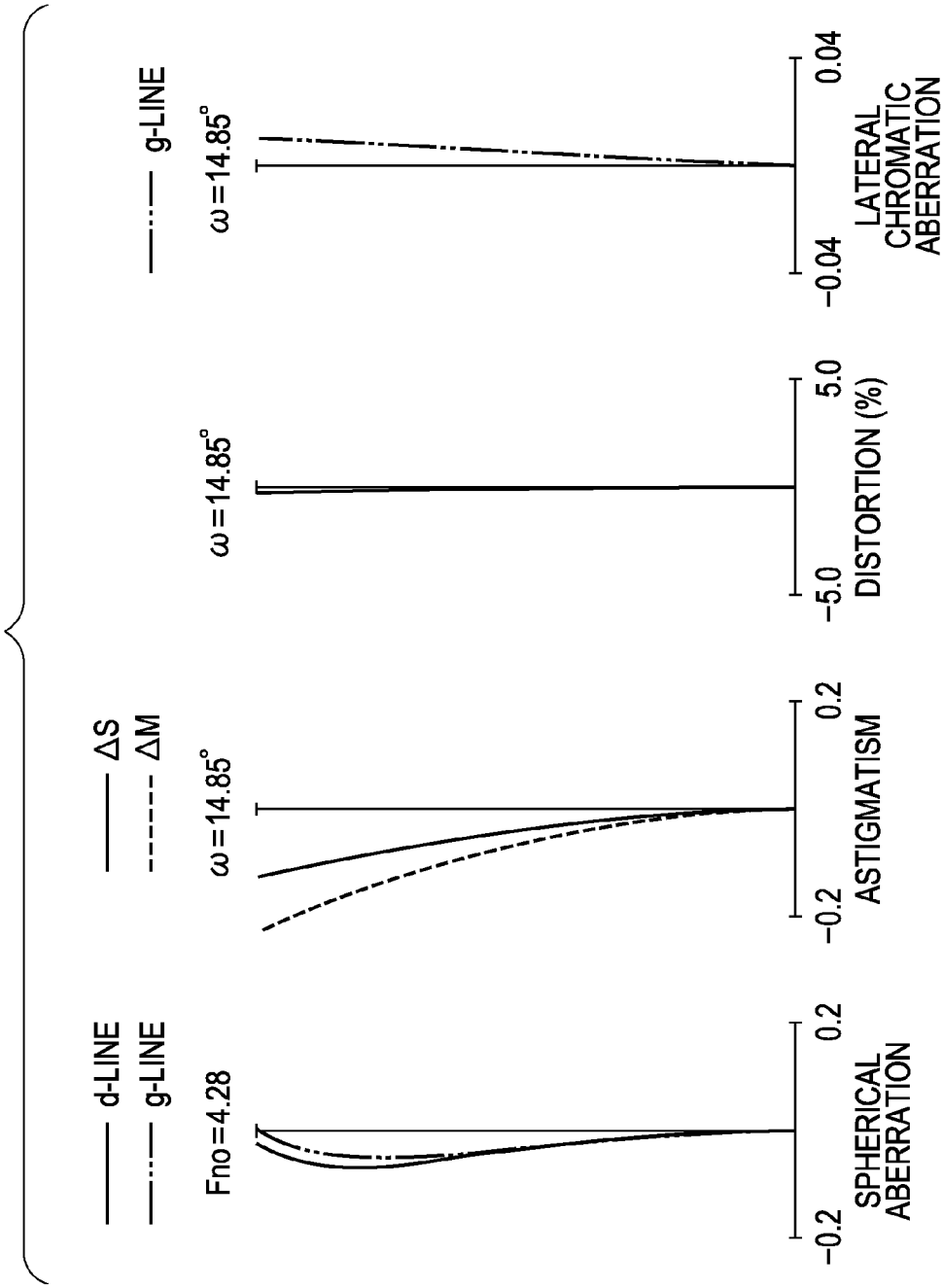
FIG. 19 includes aberration diagrams of the zoom lens at the intermediate zoom position in the fifth exemplary embodiment.
Figure 20:
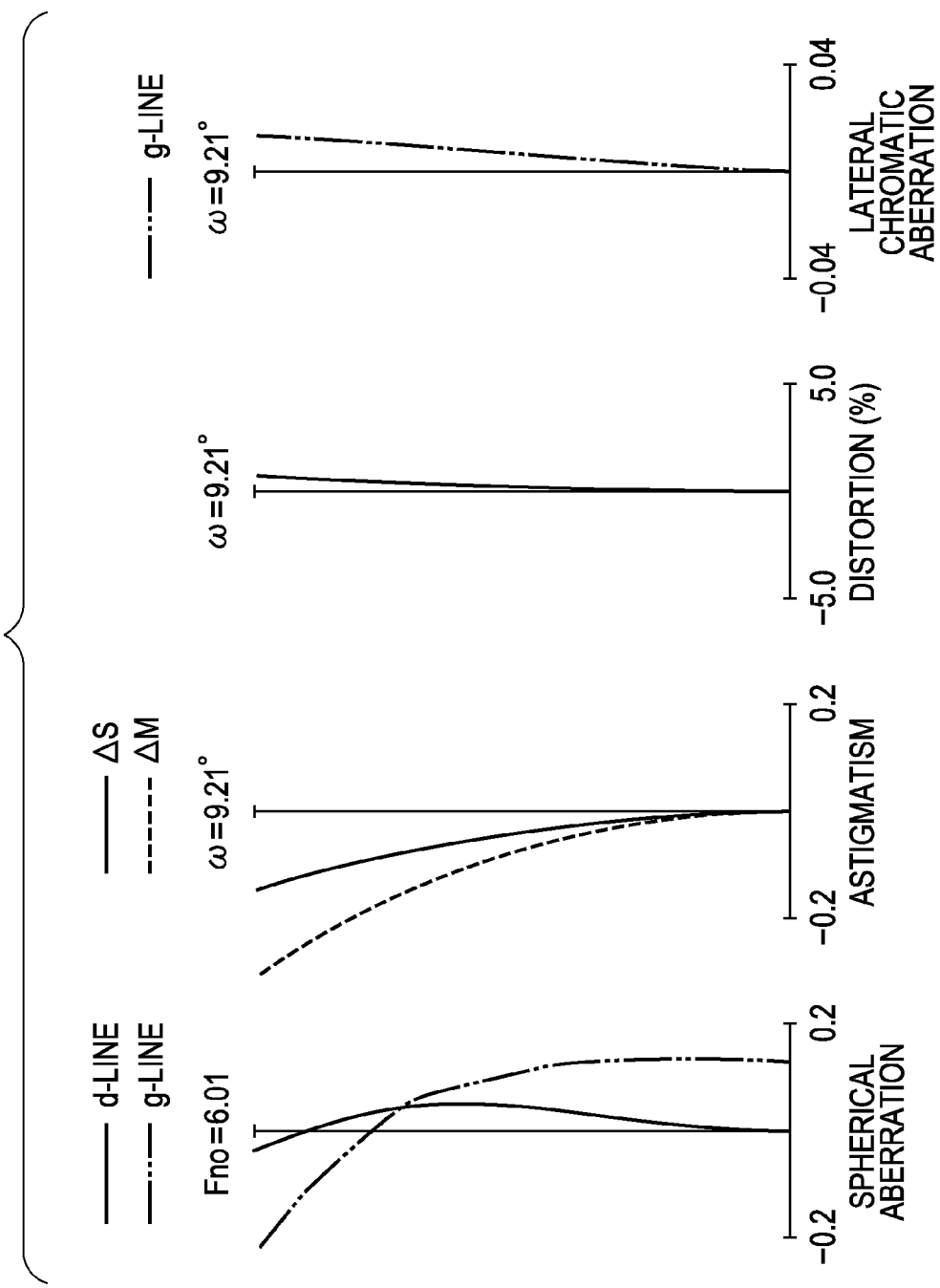
FIG. 20 includes aberration diagrams of the zoom lens at the telephoto end in the fifth exemplary embodiment.

FIG. 17 is a cross-sectional view of a zoom lens at the wide angle end according to a fifth exemplary embodiment of the present invention. FIGS. 18, 19, and 20 are aberration diagrams of the zoom lens, respectively, at the wide angle end, at the intermediate zoom position, and at the telephoto end. The zoom lens of the fifth exemplary embodiment has a zoom ratio of 3.9 and an aperture ratio of about 2.8 to 6.0.

Figure 21:
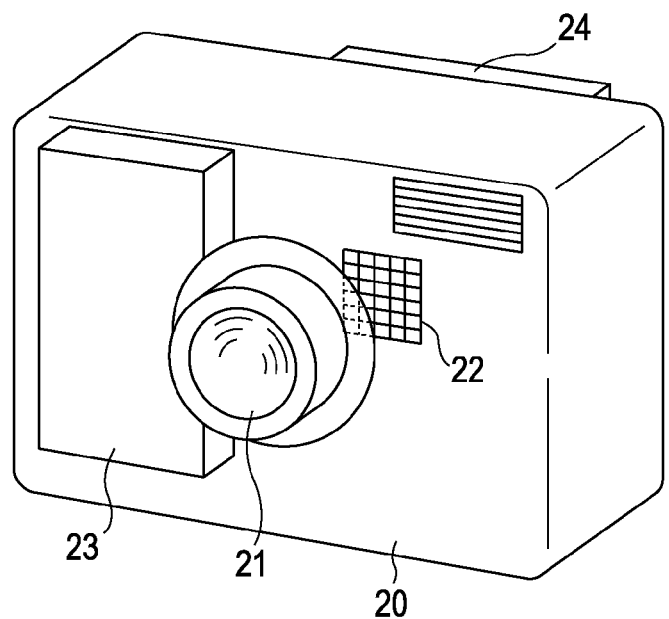
FIG. 21 is a schematic view showing the principal part of an image pickup apparatus according to the present invention.

FIG. 21 is a schematic view showing the principal part of a digital still camera equipped with the zoom lens according to the present invention.

In the exemplary embodiments, the zoom lens is an imaging lens system used in an image pickup apparatus. In FIGS. 1, 5, 9, 13, and 17 serving as the cross-sectional views of the zoom lens, the left side is an object side (front), and the right side is an image side (rear).

In the cross-sectional views, L1 represents a first lens unit having a negative refractive power (optical power=the reciprocal of the focal length), L2 represents a second lens unit having a positive refractive power, and L3 represents a third lens unit having a positive refractive power.

An f-number determining member SP functions as an aperture stop that determines (limits) an open f-number (Fno) (hereinafter also referred to as an aperture stop).

An optical block G corresponding to an optical filter, a face plate, a crystal low-pass filter, and an infrared cut-off filter. When the zoom lens is used as an imaging optical system of a video camera or a digital still camera, an image plane IP corresponds to an image pickup surface of a solid-state image pickup element (photoelectric transducer) such as a CCD sensor or a CMOS sensor.

In the aberration diagrams, d and g respectively represent a d-line and a g-line, Fno represents the f-number, and $\Delta M$ and $\Delta S$ respectively represent a meridional image plane and a sagittal image plane. Lateral chromatic aberration is represented by the g-line, and $\omega$ represents the half field angle.

In the following exemplary embodiments, the wide angle end and the telephoto end refer to zoom positions provided when the zooming lens unit (second lens unit L2) is positioned at opposite ends of a mechanical moving range in which the lens unit is movable on the optical axis.

In case of zooming from the wide angle end to the telephoto end, the first lens unit L1 moves to the image side along a convex locus, the second lens unit L2 monotonously moves to the object side, and the third lens unit L3 moves to the image side.

During zooming from the wide angle end to the telephoto end, the second lens unit L2 is moved to the object side so as to function as a variator. Further, the first lens unit L1 reciprocates (along a locus including a convex portion on the image side) and the third lens unit L3 moves to the image side, thereby correcting the displacement of the image point due to zooming.

The refractive powers of the lens units are increased by size reduction of the entire lens system. The third lens unit L3 has a relatively large refractive power so as to decrease the refractive power of a so-called two-unit short zoom system composed of the first and second lens units L1 and L2. This suppresses aberration caused at the lenses that constitute the first lens unit L1, and achieves a high optical performance.

The third lens unit L3 also functions as a field lens in order to meet the demand that the lens system in the image pickup apparatus using the solid-state image pickup element is telecentric on the image side.

Figure 22:
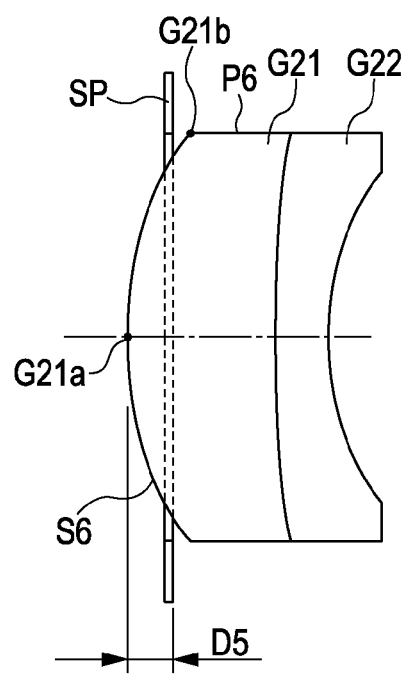
FIG. 22 is an explanatory view showing an f-number determining aperture stop.

FIG. 22 is an explanatory view showing the position of the f-number determining member (aperture stop) SP.

In the optical-axis direction, the f-number determining member SP is provided between an object-side vertex G21a of a lens G21 of the second lens unit L2 closest to the object side, and an intersection G21b of an object-side surface S6 and a peripheral portion (edge portion) P6 of the lens G21, as shown in FIG. 22.

In this way, the f-number determining member SP is disposed in the second lens unit L2, and is moved together with the second lens unit L2 during zooming so as to decrease the distance between the entrance pupil and the first lens unit L1 at the wide angle side.

This prevents the increase in effective diameter of the lenses that constitute the first lens unit L1.

Off-axial aberrations are cancelled by the first lens unit L1 and the third lens unit L3 arranged with the f-number determining member SP disposed therebetween. This allows the entire lens system to have a high optical performance.

Since the f-number determining member SP is thus disposed closer to the image side than the object-side vertex G21a of the lens G21 of the second lens unit L2 that is closest to the object side, the retracted length of the zoom lens is reduced when the lens units are retracted.

A description will now be given of the reason why the lens retracted length is reduced by the above-described position of the f-number determining member SP.

In a short zoom type three-unit zoom lens including first, second, and third lens units respectively having negative, positive, and positive refractive powers, it is common that an aperture stop for determining the open f-number is disposed between the first lens unit and the second lens unit.

Further, in this short zoom type three-unit zoom lens, a positive meniscus lens having a concave surface facing toward the image side is generally disposed in a portion of the first lens unit closest to the image side.

In order to make the distance between the first and second lens units in a lens retracted state than in an imaging state, the outer peripheral portion of the positive meniscus lens in the first lens unit interferes with the aperture stop because the positive lens has a concave surface facing toward the image side.

For this reason, it is difficult to decrease the zoom lens retracted length by a length corresponding to the distance from the image-side vertex to the outer peripheral portion of the positive meniscus lens in the optical-axis direction.

When the aperture stop is disposed between the first and second lens units, it is necessary to ensure some distance between the aperture stop and the object-side vertex of the lens of the second lens unit closest to the object side. This also hinders the zoom lens retracted length from being reduced.

In the exemplary embodiments of the present invention, the f-number determining member SP serving as the aperture stop is disposed between the object-side vertex G21a of the lens G21 of the second lens unit L2 closest to the object side and the intersection G21b of the object-side surface S6 and the lens end face of the lens G21, as described above.

Consequently, a member that causes mechanical interference while in the lens retracted state is not provided between the first lens unit L1 and the second lens unit L2, and the distance between the first and second lens units L1 and L2 is minimized in the lens retracted state.

The lens configuration of the lens units will be described in detail.

The first lens unit L1 includes a negative lens G11 and a positive lens G12, and at least one of the surfaces of the two lenses G11 and G12 is aspherical.

More specifically, in the first lens unit L1, a negative meniscus lens G11 with a concave surface facing toward the image side and a positive meniscus lens G12 with a convex surface pointing toward the object side are arranged in that order from the object side to the image side. An image-side surface of the negative lens G11 is aspherical.

The first lens unit L1 serves to guide the principal ray onto the center of the f-number determining member SP. Since the refraction amount of the principal ray is large particularly on the wide angle side, off-axial aberrations, especially, astigmatism and distortion easily occur.

Accordingly, in the exemplary embodiments, the first lens unit L1 includes the negative lens G11 and the positive lens G12 in order to suppress the increase in the diameter of the lens closest to the object side, in a manner similar to that adopted in a normal wide-angle lens system.

Further, the object-side surface of the negative lens G11 is aspherical so that the positive refractive power is large on the periphery, and the image-side surface thereof is shaped such that the negative refractive power is small on the periphery.

This allows well-balanced correction of astigmatism and distortion. Moreover, since the first lens unit L1 is composed of a small number of lenses, that is, two lenses, the entire zoom lens is made compact.

In order to prevent off-axial aberration due to refraction of the principal ray, the shapes of the lenses in the first lens unit L1 are similar to concentric spherical surfaces with respect to the intersection point of the f-number determining member SP and the optical axis.

In the second lens unit L2, a positive lens G21, a negative lens G22, a negative lens G23, and a positive lens G24 are arranged in that order from the object side to the image side.

More specifically, the second lens unit L2 is formed by a cemented lens in which a positive lens G21 having a convex surface on the object side, a negative lens G22 having a concave surface on the image side, a negative lens G23 having a convex surface on the object side, and a positive biconvex lens G24 are joined in that order from the object side to the image side.

In the second lens unit L2, the positive lens G21 is disposed closest to the object side so as to decrease the refraction angle of the off-axis light beam emitted from the first lens unit L1 and to thereby avoid off-axial aberration.

The axial light passes through the positive lens G21 closest to the object side at the highest position above the optical axis. The positive lens G21 principally participates in correcting spherical aberration and coma aberration.

Accordingly, in the exemplary embodiments, an object-side surface of the positive lens G21 is aspherical so that the positive refractive index is low on the periphery of the lens, thus properly correcting spherical aberration and coma aberration.

Further, an image-side surface of the negative lens G22 is concave. This cancels aberration caused at the object-side surface of the positive lens G21.

Axial chromatic aberration and lateral chromatic aberration are properly corrected by joining the negative lens G23 and the positive lens G24 into a cemented lens.

The positive lens G21 and the negative lens G22 can be joined into a cemented lens, and the negative lens G23 and the positive lens G24 can be provided separately.

The third lens unit L3 is formed by a positive lens G31 having a convex surface on the object side. The third lens unit L3 also functions as a field lens so that the entire lens system is telecentric on the image side.

The following relationships hold:

$$sk'=f3(1-\beta 3),\text{ and}$$

$$0<\beta 3<1.0$$

where sk' represents the back focus, f3 represents the focal length of the third lens unit L3, and β3 represents the imaging magnification of the third lens unit L3.

When the third lens unit L3 is moved to the image side during zooming from the wide angle end to the telephoto end, the back focus sk' decreases, and the imaging magnification β3 of the third lens unit L3 increases on the telephoto side.

As a result, the third lens unit L3 can also participate in zooming. For this reason, the moving amount of the second lens unit L2 for zooming can be reduced.

By reducing the moving amount of the second lens unit L2 for zooming in this way, the space is saved and the total size of the zoom lens is reduced.

During focusing from an object at infinity to a near object, a high optical performance can be obtained by moving the first lens unit L1 to the object side. Alternatively, focusing can be performed by moving the third lens unit L3 to the object side.

When focusing is performed by using the third lens unit L3, the weight of the zoom lens is made lighter than when focusing is performed by using the first lens unit L1. Therefore, the load on the actuator can be reduced.

Further, zooming can be performed while linking the first lens unit L1 and the second lens unit L2 by a cam or the like. This can easily obtain a simpler mechanism and higher accuracy.

During zooming from the wide angle end to the telephoto end, the third lens unit L3 is moved to the image side. For this reason, when focusing is performed by using the third lens unit L3, the telephoto end at which the moving amount to the object side for focusing is large can be provided on the image side. Therefore, the space can be utilized effectively.

In particular, it is easy to minimize the total moving amount of the third lens unit L3 needed for zooming and focusing, and to reduce the total size of the lens system.

In the above-described embodiments, the three lens units are moved during zooming. Alternatively, two of the lens units (e.g., the first and second lens units, the first and third lens units, or the second and third lens units) can be moved so as to change the distances between the lens units.

For example, a lens unit having a small refractive power or a converter lens unit may be added on the object side of the first lens unit L1 and/or the image side of the third lens unit L3.

As described above, in the three-unit zoom lens according to the exemplary embodiments including the lens units having negative, positive, and positive refractive powers, aberrations can be properly corrected over the entire zoom range, and a high optical performance can be obtained. Further, while the zoom lens is made compact by reducing the thicknesses of the lens units, it has a good telecentric characteristic and is suitably used in a camera (image pickup apparatus) having a solid-state image pickup element.

Moreover, off-axial aberrations, especially, astigmatism, distortion, and spherical aberration caused when the aperture ratio is high, can be properly corrected by effectively adopting aspherical surfaces in the lens units.

In particular, aspherical surfaces are effectively adopted in the first lens unit L1 and the second lens unit L2 so as to properly set the refractive powers of the lens units L1 and L2. This allows effective correction of off-axial aberrations, especially, astigmatism, distortion, and spherical aberration caused when the aperture ratio is high.

According to the exemplary embodiments, the zoom lens is compact with a small number of lenses, and is suitably used in an image pickup apparatus having a solid-state image pickup element. Particularly, the zoom lens is suitably used as a retractable zoom lens, and has a high optical performance with a zoom ratio of about 3.5 to 4.

The zoom lens satisfies at least one of the following conditional expressions:

$$0.70 < f2/\sqrt{(fW \cdot fT)} < 0.95 \quad (1)$$

$$2.9 < (\beta 2T \cdot \beta 3W)/(\beta 2W \cdot \beta 3T) < 3.7 \quad (2)$$

$$0.18 < D2nd/fT < 0.25 \quad (3)$$

$$0 < L1T/fT < 0.025 \quad (4)$$

$$1.2 < |f1|/f2 < 1.4 \quad (5)$$

$$0.15 < f2/f3 < 0.45 \quad (6)$$

where fW and fT respectively represent the focal lengths of the entire system at the wide angle end and the telephoto end, f1, f2, and f3 respectively represent the focal lengths of the first, second, and third lens units L1, L2, and L3, β2W and β2T respectively represent the imaging magnifications of the second lens unit L2 at the wide angle end and the telephoto end, β3W and β3T respectively represent the imaging magnifications of the third lens unit L3 at the wide angle end and the telephoto end, D2nd represents the length from the surface of the second lens unit L2 closest to the object side to the surface of the second lens unit L2 closest to the image side, and L1T represents the distance between the first lens unit L1 and the second lens unit L2 at the telephoto end. Advantages are achieved by satisfying the conditional expressions.

Technical meanings of the conditional expressions will now be described.

When the value is more than the upper limit in Conditional Expression 1 and the focal length of the second lens unit L2 increases, the power (refractive power) of the second lens unit L2 decreases, and the moving amounts of the lens units for zooming increase in order to ensure a predetermined magnification (zoom ratio). As a result, it is difficult to make the entire system compact.

When the value is less than the lower limit in Conditional Expression 1 and the focal length of the second lens unit L2 decreases, the power of the second lens unit L2 increases, and the moving amounts of the lens units needed to ensure the predetermined magnification decrease. This is advantageous in size reduction. However, since the power of the second lens unit L2 becomes too large, it is difficult to correct aberrations such as astigmatism and coma aberration.

When the value is more than the upper limit in Conditional Expression 2, the load of zooming shared by the second lens unit increases, and the predetermined magnification is ensured easily. However, it is necessary to distribute the load of aberration correction by increasing the number of lenses that constitute the lens units. As a result, it is difficult to make the entire lens system compact.

When the value is less than the lower limit in Conditional Expression 2, the load of zooming shared by the third lens unit increases, and the moving amount of the third lens unit L3 for zooming increases. For this reason, it is difficult to make the entire lens system compact.

Moreover, since the share of the second lens unit L2 for zooming decreases, it is difficult to ensure the predetermined magnification.

When the value is less than the lower limit in Conditional Expression 3 and the length D2nd decreases, the entire lens system can be advantageously made compact. However, the thicknesses of the edge portions of the lenses decrease, and manufacturing is difficult.

When the value is more than the upper limit in Conditional Expression 3 and the length D2nd increases, it is difficult to make the entire lens system compact.

When the value is more than the upper limit in Conditional Expression 4, the distance L1T between the first lens unit L1 and the second lens unit L2 becomes too long, and the total length of the lens system increases. As a result, it is difficult to make the entire lens system compact.

When the value is less than the lower limit in Conditional Expression 4 and the distance L1T decreases, the first lens unit L1 and the second lens unit L2 mechanically interfere with each other.

When the value is more than the upper limit in Conditional Expression 5 and the power of the first lens unit L1 decreases, the focal length of the entire system is shifted to the telephoto end, and therefore, it is difficult to ensure a wide angle of view.

When the value is more than the upper limit in Conditional Expression 5 and the power of the second lens unit L2 increases, the number of lenses in the second lens unit L2 increases in order to correct astigmatism and coma aberration. As a result, it is difficult to make the entire lens system compact.

When the value is less than the lower limit in Conditional Expression 5 and the power of the first lens unit L1 increases, the distance between the first lens unit L1 and the second lens unit L2 at the telephoto end decreases, and the first and second lens units L1 and L2 sometimes mechanically interfere with each other.

When the value is less than the lower limit in Conditional Expression and the power of the second lens unit L2 decreases, the moving amount of the second lens unit L2 for zooming increases, and it is difficult to make the entire lens system compact.

When the value is more than the upper limit in Conditional Expression 6 and the power of the second lens unit L2 decreases, the moving amount of the second lens unit L2 for zooming increases in order to ensure the predetermined magnification, and it is difficult to make the entire lens system compact.

When the value is more than the upper limit in Conditional Expression 6 and the power of the third lens unit L3 increases, the number of lenses increases in order to correct astigmatism, and it is difficult to make the entire lens system compact.

When the value is less than the lower limit in Conditional Expression 6 and the power of the second lens unit L2 increases, the number of lenses in the second lens unit L2 increases in order to correct astigmatism and coma aberration. Therefore, it is difficult to make the entire lens system compact.

In order to further reduce the size of the entire lens system while properly correcting aberrations in the exemplary embodiments, the numerical values in Conditional Expressions 1 to 6 should be set within the following ranges:

$$0.78 < f2/\sqrt{(fW \cdot fT)} < 0.94 \quad (1a)$$

$$3.05 < (\beta 2T \cdot \beta 3W)/(\beta 2W \cdot \beta 3T) < 3.50 \quad (2a)$$

$$0.19 < D2nd/fT < 0.24 \quad (3a)$$

$$0 < L1T/fT < 0.020 \quad (4a)$$

$$1.24 < |f1|/f2 < 1.37 \quad (5a)$$

$$0.17 < f2/f3 < 0.42 \quad (6a)$$

The upper and lower limit values in Conditional Expressions 1a to 6a may be arbitrarily combined with the numerical values in the above Conditional Expressions 1 to 6.

Numerical examples of the present invention will be described below. In the numerical examples, i represents the order number of the lens surface from the object side, Ri represents the radius of curvature of the lens surface, Di represents the lens thickness and air gap between the i-th lens surface and the i+1-th lens surface, and Ni and vi respectively represent the refractive index and the Abbe number for the d-line. Two surfaces closest to the image side are formed of filter members such as a crystal low-pass filter and an infrared cut-off filter. B, C, D, and E are aspherical coefficients. The aspherical shape is given by the following expression:

$$X = \frac{(1/R)H^2}{1 + \sqrt{1 - (1+K)(H/R)^2}} + BH^4 + CH^6 + DH^8 + EH^{10}$$

where X represents the displacement from the vertex of the surface in the optical axis direction at the height H from the optical axis, R represents the paraxial radius of curvature, and K is a conic constant.

Further, "e-0x" means "×10$^{-x}$", f represents the focal length, Fno represents the f-number, and ω represents the half field angle. Table 1 shows the relationships between the above-described conditional expressions and the numerical examples.

In the first to fifth numerical examples, the value D5 is negative because it is assumed that the f-number determining member and the lens 21 of the second lens unit L2 are arranged in that order from the object side. More specifically, as shown in FIG. 22, the f-number determining member (aperture stop) SP is disposed closer to the image side by the absolute value D5 than the object-side vertex G21a of the lens surface S6 of the object-side lens G21 in the second lens unit L2.

FIRST NUMERICAL EXAMPLE f = 7.93-28.48  Fno = 2.87-5.97  2ω = 30.26°-9.22°

| | | | |
|---|---|---|---|
| R1 = 49.423 | D1 = 1.55 | N1 = 1.88300 | v1 = 40.8 |
| R2 = 6.314 | D2 = 1.85 | | |
| R3 = 10.326 | D3 = 2.00 | N2 = 1.84666 | v2 = 23.9 |
| R4 = 28.197 | D4 = variable | | |
| R5 = aperture stop | D5 = −0.50 | | |
| R6 = 5.330 | D6 = 2.50 | N3 = 1.80447 | v3 = 40.9 |
| R7 = 222.954 | D7 = 0.60 | N4 = 1.72825 | v4 = 28.5 |
| R8 = 4.325 | D8 = 0.85 | | |
| R9 = 12.141 | D9 = 0.55 | N5 = 1.76182 | v5 = 26.5 |
| R10 = 7.382 | D10 = 1.85 | N6 = 1.63854 | v6 = 55.4 |
| R11 = −30.790 | D11 = variable | | |
| R12 = 18.849 | D12 = 1.75 | N7 = 1.48749 | v7 = 70.2 |
| R13 = −144.718 | D13 = variable | | |
| R14 = ∞ | D14 = 1.00 | N8 = 1.51633 | v8 = 64.1 |
| R15 = ∞ | | | |

| | Focal Length | | |
|---|---|---|---|
| Variable Distance | 7.93 | 17.86 | 28.48 |
| D4 | 17.54 | 4.77 | 1.00 |
| D11 | 7.04 | 17.85 | 28.84 |
| D13 | 5.25 | 4.50 | 3.57 |

| Aspherical Coefficient | | |
|---|---|---|
| R1 | k = −1.63030e+01 | B = 1.86896e−06 | C = −2.36716e−07 |
| | D = 1.22911e−08 | E = −9.31092e−11 | |
| R2 | k = −1.04870e+00 | B = 2.13256e−04 | |
| | C = 3.10874e−07 | D = 1.71783e−08 | E = 3.75653e−10 |

-continued

| f = 7.93-28.48 | Fno = 2.87-5.97 | 2ω = 30.26°-9.22° |
|---|---|---|
| R6 | K = −2.92226e−01  B = −2.16462e−05  C = 1.48039e−07 |  |
|  | D = 2.80255e−09 |  |

SECOND NUMERICAL EXAMPLE

| f = 7.52-27.00  Fno = 2.88-5.90  2ω = 30.96°-9.49° ||||
|---|---|---|---|
| R1 = 59.516 | D1 = 1.55 | N1 = 1.80220 | ν1 = 40.6 |
| R2 = 5.926 | D2 = 1.95 | | |
| R3 = 10.004 | D3 = 1.90 | N2 = 1.84666 | ν2 = 23.9 |
| R4 = 24.105 | D4 = variable | | |
| R5 = aperture stop | D5 = −0.50 | | |
| R6 = 5.188 | D6 = 2.30 | N3 = 1.80447 | ν3 = 40.9 |
| R7 = 80.183 | D7 = 0.55 | N4 = 1.69895 | ν4 = 30.1 |
| R8 = 4.276 | D8 = 0.92 | | |
| R9 = 13.601 | D9 = 0.50 | N5 = 1.69895 | ν5 = 30.1 |
| R10 = 6.217 | D10 = 2.00 | N6 = 1.60311 | ν6 = 60.6 |
| R11 = −21.549 | D11 = aperture stop | | |
| R12 = 15.730 | D12 = 1.54 | N7 = 1.48749 | ν7 = 70.2 |
| R13 = 163.816 | D13 = aperture stop | | |
| R14 = ∞ | D14 = 1.00 | N8 = 1.51633 | ν8 = 64.1 |
| R15 = ∞ | | | |

| | Focal Length |||
|---|---|---|---|
| Variable Distance | 7.52 | 16.99 | 27.00 |
| D4 | 17.25 | 4.47 | 0.70 |
| D11 | 7.12 | 17.37 | 27.62 |
| D13 | 4.88 | 4.13 | 3.38 |

| Aspherical Coefficient |||
|---|---|---|
| R2 | k = −9.83319e−01  B = 2.18697e−04 | C = 2.13996e−06 |
|  | D = −4.99114e−08  E = 8.16788e−10 | |
| R6 | k = −2.71398e−01  B = −6.70237e−05 | |
|  | C = −3.21350e−07  D = −4.99742e−08 | |

THIRD NUMERICAL EXAMPLE

| f = 7.93-27.67  Fno = 2.89-5.92  2ω = 30.25°-9.49° ||||
|---|---|---|---|
| R1 = 54.006 | D1 = 1.55 | N1 = 1.84862 | ν1 = 40.0 |
| R2 = 6.174 | D2 = 1.88 | | |
| R3 = 10.342 | D3 = 2.05 | N2 = 1.84666 | ν2 = 23.9 |
| R4 = 28.454 | D4 = variable | | |
| R5 = aperture stop | D5 = −0.80 | | |
| R6 = 5.425 | D6 = 2.55 | N3 = 1.80447 | ν3 = 40.9 |
| R7 = ∞ | D7 = 0.65 | N4 = 1.72825 | ν4 = 28.5 |
| R8 = 4.382 | D8 = 0.79 | | |
| R9 = 11.874 | D9 = 0.60 | N4 = 1.76182 | ν4 = 26.5 |
| R10 = 7.859 | D10 = 1.60 | N5 = 1.62299 | ν5 = 58.2 |
| R11 = −29.448 | D11 = variable | | |
| R12 = 17.062 | D12 = 1.80 | N6 = 1.48749 | ν6 = 70.2 |
| R13 = 1266.784 | D13 = variable | | |
| R14 = ∞ | D14 = 1.00 | N7 = 1.51633 | ν7 = 64.1 |
| R15 = ∞ | | | |

| | Focal Length |||
|---|---|---|---|
| Variable Distance | 7.93 | 17.47 | 27.67 |
| D4 | 17.66 | 5.07 | 1.25 |
| D11 | 6.91 | 17.18 | 27.65 |

-continued

| f = 7.93-27.67  Fno = 2.89-5.92  2ω = 30.25°-9.49° ||||
|---|---|---|---|
| D13 | 5.20 | 4.42 | 3.45 |

| Aspherical Coefficient |||
|---|---|---|
| R1 | k = −7.32833e+00  B = 8.15957e−07 | C = −1.39267e−07 |
|  | D = 5.85110e−09  E = −3.87833e−11 | |
| R2 | k = −1.04126e+00  B = 2.25136e−04 | |
|  | C = 8.82013e−07  D = 2.07016e−09 | E = 1.65137e−10 |
| R6 | k = −1.64642e−01  B = −1.31383e−04 | |
|  | C = −1.40227e−06  D = −1.30353e−07 | E = −1.63698e−09 |
|  | F = 7.71946e−12 | |

FOURTH NUMERICAL EXAMPLE

| f = 7.85-30.00  Fno = 2.81-5.99  2ω = 30.50°-8.76° ||||
|---|---|---|---|
| R1 = 41.707 | D1 = 1.40 | N1 = 1.88300 | ν1 = 40.8 |
| R2 = 6.579 | D2 = 1.89 | | |
| R3 = 10.136 | D3 = 1.70 | N2 = 1.84666 | ν2 = 23.9 |
| R4 = 20.952 | D4 = variable | | |
| R5 = aperture stop | D5 = −0.50 | | |
| R6 = 5.165 | D6 = 2.47 | N3 = 1.80610 | ν3 = 40.9 |
| R7 = −41.754 | D7 = 0.21 | | |
| R8 = −32.627 | D8 = 0.61 | N4 = 1.72825 | ν4 = 28.5 |
| R9 = 4.180 | D9 = 0.60 | | |
| R10 = 11.169 | D10 = 0.40 | N5 = 1.90136 | ν5 = 31.6 |
| R11 = 7.312 | D11 = 1.62 | N6 = 1.63854 | ν6 = 55.4 |
| R12 = −22.186 | D12 = variable | | |
| R13 = 27.721 | D13 = 1.45 | N7 = 1.48749 | ν7 = 70.2 |
| R14 = 269.441 | D14 = variable | | |
| R15 = ∞ | D15 = 1.00 | N8 = 1.51633 | ν8 = 64.1 |
| R16 = ∞ | | | |

| | Focal Length |||
|---|---|---|---|
| Variable Distance | 7.85 | 18.39 | 30.00 |
| D4 | 17.64 | 4.18 | 0.61 |
| D12 | 6.94 | 15.92 | 27.76 |
| D14 | 3.97 | 3.57 | 0.31 |

| Aspherical Coefficient |||
|---|---|---|
| R1 | k = 1.68232e+00  B = −1.85834e−06 | C = −8.50891e−08 |
|  | D = −4.09423e−09  E = −5.70978e−12 | |
| R2 | k = −1.04294e+00  B = 2.15754e−04 | C = 3.22993e−06 |
|  | D = −7.72372e−08  E = 4.18884e−10 | |
| R6 | k = −3.97654e−01  B = 4.83993e−06 | C = 2.44915e−06 |
|  | D = −4.14938e−09 | |

FIFTH NUMERICAL EXAMPLE

| f = 7.31-28.53  Fno = 2.78-6.01  2ω = 32.31°-9.21° ||||
|---|---|---|---|
| R1 = 43.895 | D1 = 1.55 | N1 = 1.88300 | ν1 = 40.8 |
| R2 = 6.349 | D2 = 1.90 | | |
| R3 = 10.176 | D3 = 2.00 | N2 = 1.84666 | ν2 = 23.9 |
| R4 = 22.461 | D4 = variable | | |
| R5 = aperture stop | D5 = −0.50 | | |
| R6 = 5.180 | D6 = 2.45 | N3 = 1.80610 | ν3 = 40.9 |
| R7 = −56.885 | D7 = 0.18 | | |
| R8 = −44.837 | D8 = 0.60 | N4 = 1.72825 | ν4 = 28.5 |
| R9 = 4.208 | D9 = 0.89 | | |
| R10 = 11.309 | D10 = 0.55 | N5 = 1.90136 | ν5 = 31.6 |
| R11 = 7.419 | D11 = 1.60 | N6 = 1.63854 | ν6 = 55.4 |

-continued f = 7.31-28.53    Fno = 2.78-6.01    2ω = 32.31°-9.21°

| | | | |
|---|---|---|---|
| R12 = −22.348 | D12 = variable | | |
| R13 = 22.105 | D13 = 1.75 | N7 = 1.48749 | ν7 = 70.2 |
| R14 = 300.000 | D14 = variable | | |
| R15 = ∞ | D15 = 1.00 | N8 = 1.51633 | ν8 = 64.1 |
| R16 = ∞ | | | |

| | Focal Length | | |
|---|---|---|---|
| Variable Distance | 7.31 | 17.44 | 28.53 |
| D4 | 18.36 | 4.57 | 0.93 |
| D12 | 7.13 | 16.66 | 27.89 |
| D14 | 3.59 | 3.05 | 0.81 |

Aspherical Coefficient

| | | | |
|---|---|---|---|
| R2 | k = −1.03494e+00 | B = 2.12749e−04 | C = 2.87627e−06 |
| | D = −5.79135e−08 | E = 7.53642e−10 | |
| R6 | k = −3.60747e−01 | B = −2.17817e−05 | C = 1.52245e−06 |

TABLE 1

| Conditional Expression | Lower Limit | Upper Limit | First Example | Second Example | Third Example | Fourth Example | Fifth Example |
|---|---|---|---|---|---|---|---|
| (1) f2 | | | 13.767 | 13.322 | 13.670 | 12.300 | 12.500 |
| f2/√(fW·fT) | 0.70 | 0.95 | 0.9163 | 0.9349 | 0.9228 | 0.8014 | 0.8653 |
| (2) β2W | | | −0.5863 | −0.5589 | −0.5794 | −0.5211 | −0.5213 |
| β2T | | | −1.9827 | −1.9399 | −1.9012 | −1.8713 | −1.9097 |
| β3W | | | 0.7828 | 0.7982 | 0.7862 | 0.9018 | 0.8768 |
| β3T | | | 0.8318 | 0.8404 | 0.8355 | 0.9596 | 0.9338 |
| (β2T · β3W)/(β2W · β3T) | 2.90 | 3.70 | 3.1822 | 3.2388 | 3.0877 | 3.3749 | 3.4395 |
| (3) D2nd | | | 6.3530 | 6.2697 | 6.1933 | 5.9127 | 6.2665 |
| D2nd/fT | 0.18 | 0.25 | 0.2231 | 0.2322 | 0.2238 | 0.1971 | 0.2196 |
| (4) L1T | | | 0.4999 | 0.1997 | 0.4500 | 0.1050 | 0.4320 |
| L1T/fT | 0 | 0.025 | 0.0176 | 0.0074 | 0.0163 | 0.0035 | 0.0151 |
| (5) f1 | | | −17.269 | −16.562 | −17.412 | −16.708 | −16.000 |
| \|f1\|/f2 | 1.20 | 1.40 | 1.2544 | 1.2432 | 1.2738 | 1.3583 | 1.2800 |
| (6) f3 | | | 34.331 | 35.574 | 35.460 | 63.263 | 48.851 |
| F2/f3 | 0.15 | 0.45 | 0.4010 | 0.3745 | 0.3855 | 0.1944 | 0.2559 |

An example of a digital camera (image pickup apparatus) using the zoom lens according to any of the exemplary embodiments as an imaging optical system will now be described with reference to FIG. 21.

Referring to FIG. 21, the digital camera includes a main body 20, an imaging optical system 21 formed by the zoom lens according to any of the above-described exemplary embodiments, an image pickup element 22, such as a CCD, that receives an object image captured by the imaging optical system 21, a recording unit 23 that records the object image received by the image pickup element 22, and a finder 24, such as a liquid crystal panel, that allows viewing of the object image formed on the image pickup element 22.

The display element is, for example, a liquid crystal panel. The object image formed on the image pickup element 22 is displayed on the display element. The digital camera also includes a liquid crystal display panel 25 having a function similar to that of the finder 24.

By thus applying the zoom lens according to the present invention to an optical apparatus such as a digital camera, a compact image pickup apparatus having a high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-019134 filed Jan. 30, 2007, which is hereby incorporated by reference herein in its entirety.

What is claimed is:

1. A zoom lens comprising:
a first lens unit having a negative refractive power;
a second lens unit having a positive refractive power; and
a third lens unit having a positive refractive power,
wherein the first to third lens units are arranged in that order from an object side toward an image side,
wherein the distances between the first to third lens units change during zooming, and
wherein the following conditions are satisfied:

$$0.70 < f2/\sqrt{(fW \cdot fT)} < 0.95, \text{ and}$$

$$2.9 < (\beta 2T \cdot \beta 3W)/(\beta 2W \cdot \beta 3T) < 3.7$$

where fW and fT respectively represent focal lengths of the entire zoom lens at a wide angle end and a telephoto end, f2 represents the focal length of the second lens unit, β2W and β2T respectively represent the imaging magnifications of the second lens unit at the wide angle end and the telephoto end, and β3W and β3T respectively represent the imaging magnifications of the third lens unit at the wide angle end and the telephoto end.

2. The zoom lens according to claim 1, wherein the first lens unit moves along a convex locus to the image side, the second lens unit monotonously moves to the object side, and the third lens unit moves to the image side during zooming from the wide angle end to the telephoto end.

3. The zoom lens according to claim 1, further comprising:
an f-number determining member configured to determine an open f-number, and provided between an object-side vertex of a lens of the second lens unit closest to the object side, and an intersection of an object-side surface and a peripheral portion of the lens.

4. The zoom lens according to claim 1, wherein the first lens unit includes a negative lens and a positive lens, and at least one of surfaces of the lenses is aspherical.

5. The zoom lens according to claim 1,
wherein the first lens unit includes a negative meniscus lens having a concave surface on the image side and a positive meniscus lens having a convex surface on the object side,
wherein the negative meniscus lens and the positive meniscus lens are arranged in that order from the object side toward the image side, and
wherein an image-side surface of the negative meniscus lens is aspherical.

6. The zoom lens according to claim 1, wherein the second lens unit includes a positive lens, a negative lens, a negative lens, and a positive lens that are arranged in that order from the object side toward the image side.

7. The zoom lens according to claim 1, wherein the second lens unit is formed by a cemented lens in which a positive lens having a convex surface on the object side, a negative lens having a concave surface on the image side, a negative lens having a convex surface on the object side, and a positive biconvex lens are joined in that order from the object side toward the image side.

8. The zoom lens according to claim 1, wherein the following condition is satisfied:

$$0.18 < D2nd/fT < 0.25$$

where $D2nd$ represents the length of a surface closest to the object side to a surface closest to the image side in the second lens unit.

9. The zoom lens according to claim 1, wherein the following condition is satisfied:

$$0 < L1T/fT < 0.025$$

where $L1T$ represents the distance between the first lens unit and the second lens unit at the telephoto end.

10. The zoom lens according to claim 1, wherein the following condition is satisfied:

$$1.2 < |f1|/f2 < 1.4$$

where $f1$ and $f2$ respectively represent the focal lengths of the first lens unit and the second lens unit.

11. The zoom lens according to claim 1, wherein the following condition is satisfied:

$$0.15 < f2/f3 < 0.45$$

where $f2$ and $f3$ respectively represent the focal lengths of the second lens unit and the third lens unit.

12. The zoom lens according to claim 1, wherein the third lens unit moves to the object side so as to perform focusing from an object at infinity to a near object.

13. An image pickup apparatus comprising:
the zoom lens according to claim 1; and
a photoelectric transducer configured to receive an image formed by the zoom lens.

* * * * *